United States Patent
Roquemore, III et al.

(10) Patent No.: US 9,906,375 B1
(45) Date of Patent: Feb. 27, 2018

(54) SECONDARY RADIO FOR DIAGNOSTIC/DEBUG

(71) Applicant: ABL IP HOLDING LLC, Conyers, GA (US)

(72) Inventors: John Peter Roquemore, III, Suwanee, GA (US); Tyler B. Fultz, Atlanta, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/618,714

(22) Filed: Jun. 9, 2017

(51) Int. Cl.
| | |
|---|---|
| *H04W 24/00* | (2009.01) |
| *H04L 12/18* | (2006.01) |
| *H04L 12/26* | (2006.01) |
| *H04L 29/06* | (2006.01) |
| *H04W 24/06* | (2009.01) |

(52) U.S. Cl.
CPC ......... *H04L 12/1868* (2013.01); *H04L 43/12* (2013.01); *H04L 43/18* (2013.01); *H04L 63/1408* (2013.01); *H04W 24/06* (2013.01); *H04L 12/189* (2013.01)

(58) Field of Classification Search
CPC ..... H04W 24/00; H04W 56/00; H04W 60/00; H04W 24/06; H05B 37/0272; H05B 37/0281; G08C 19/00; H04L 12/189; H04L 12/1868; H04L 43/12; H04L 43/18; H04L 63/00; H04L 63/1408
See application file for complete search history.

(56) References Cited

U.S. PATENT DOCUMENTS

| | | | |
|---|---|---|---|
| 7,573,859 B2 | 8/2009 | Taylor | |
| 2002/0031101 A1* | 3/2002 | Petite | G01D 4/004 370/310 |
| 2002/0107979 A1* | 8/2002 | Sarnikowski | G06F 17/14 709/238 |
| 2010/0289643 A1* | 11/2010 | Trundle | G08C 19/16 340/545.1 |
| 2016/0267759 A1* | 9/2016 | Kerzner | G08B 25/009 |
| 2017/0223807 A1* | 8/2017 | Recker | H05B 37/0227 |

OTHER PUBLICATIONS

Silicon Laboratories, Inc. "EFR32xG1 Wireless Gecko Reference Manual," Preliminary Rev. 0.6, http://www.silabs.com/Support %20Documents/TechnicalDocs/EFR32-ReferenceManual.pdf, dated Jul. 8, 2016 (995 pages). See pp. 91-98.

* cited by examiner

*Primary Examiner* — Thanh Le
(74) *Attorney, Agent, or Firm* — RatnerPrestia

(57) ABSTRACT

A system for lighting control including a monitor device and a plurality of lighting system components. The monitoring device is configured to transmit a diagnostic command over a diagnostic band to at least one of the plurality of lighting system components. The diagnostic command including a request for diagnostic data. The plurality of lighting system components are configured to for wireless communication over the diagnostic band and a separate wireless lighting control network communication band, such that they receive via the diagnostic band, the diagnostic command transmitted from the monitor device. In response to receiving the diagnostic command, the plurality of lighting system components obtain the requested diagnostic data, and transmit via the diagnostic band, the requested diagnostic data to the monitor device.

20 Claims, 26 Drawing Sheets

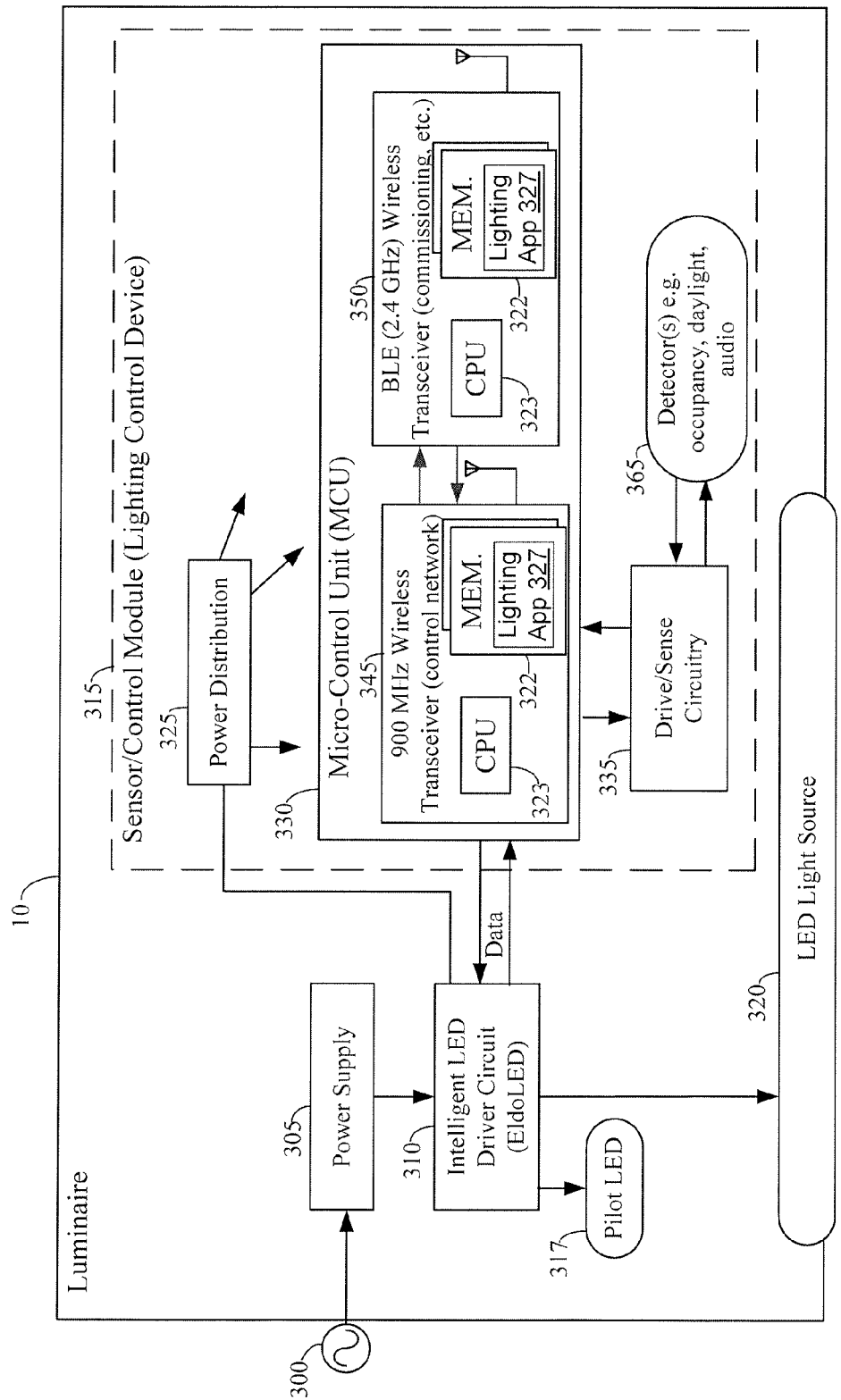

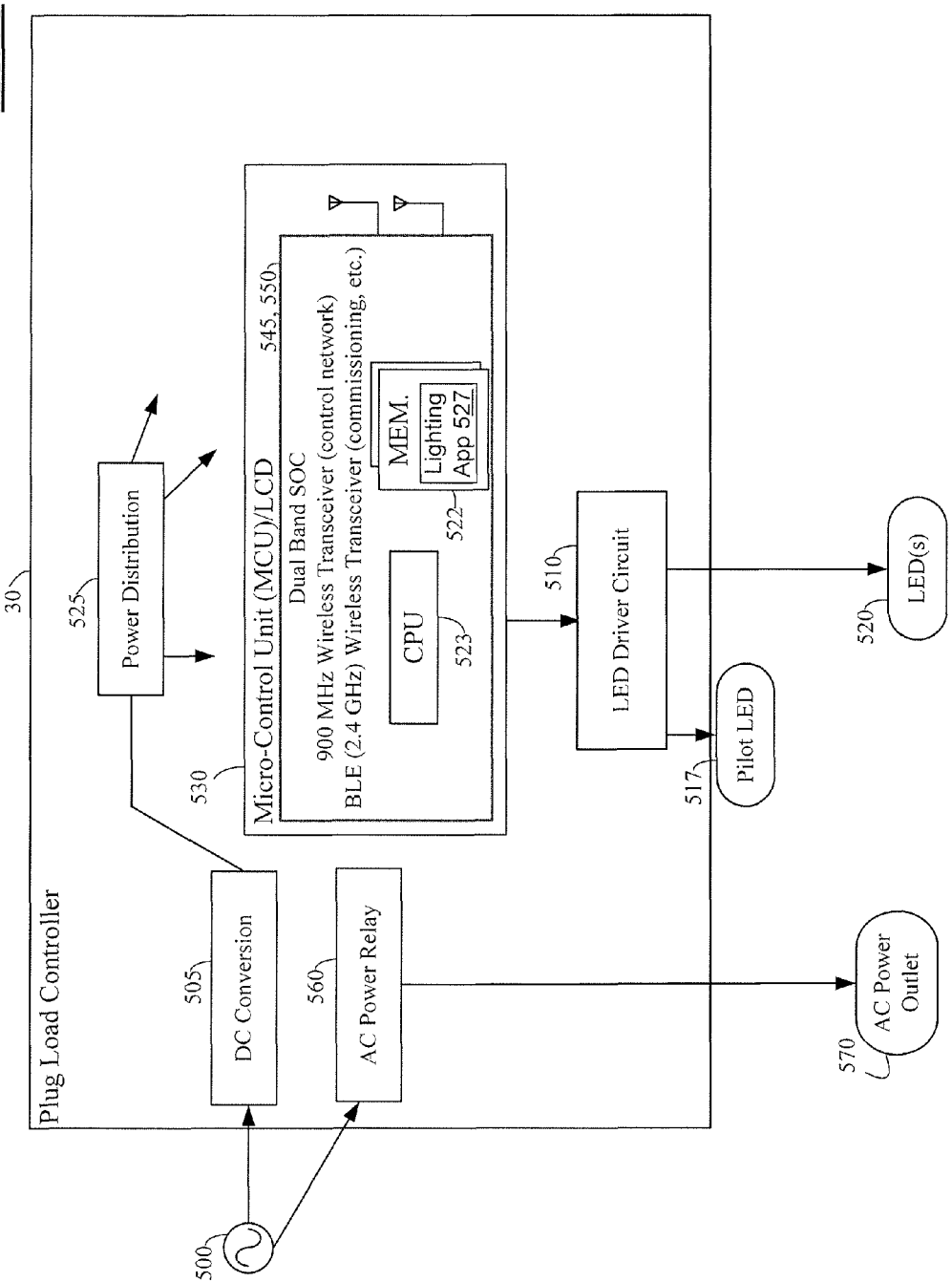

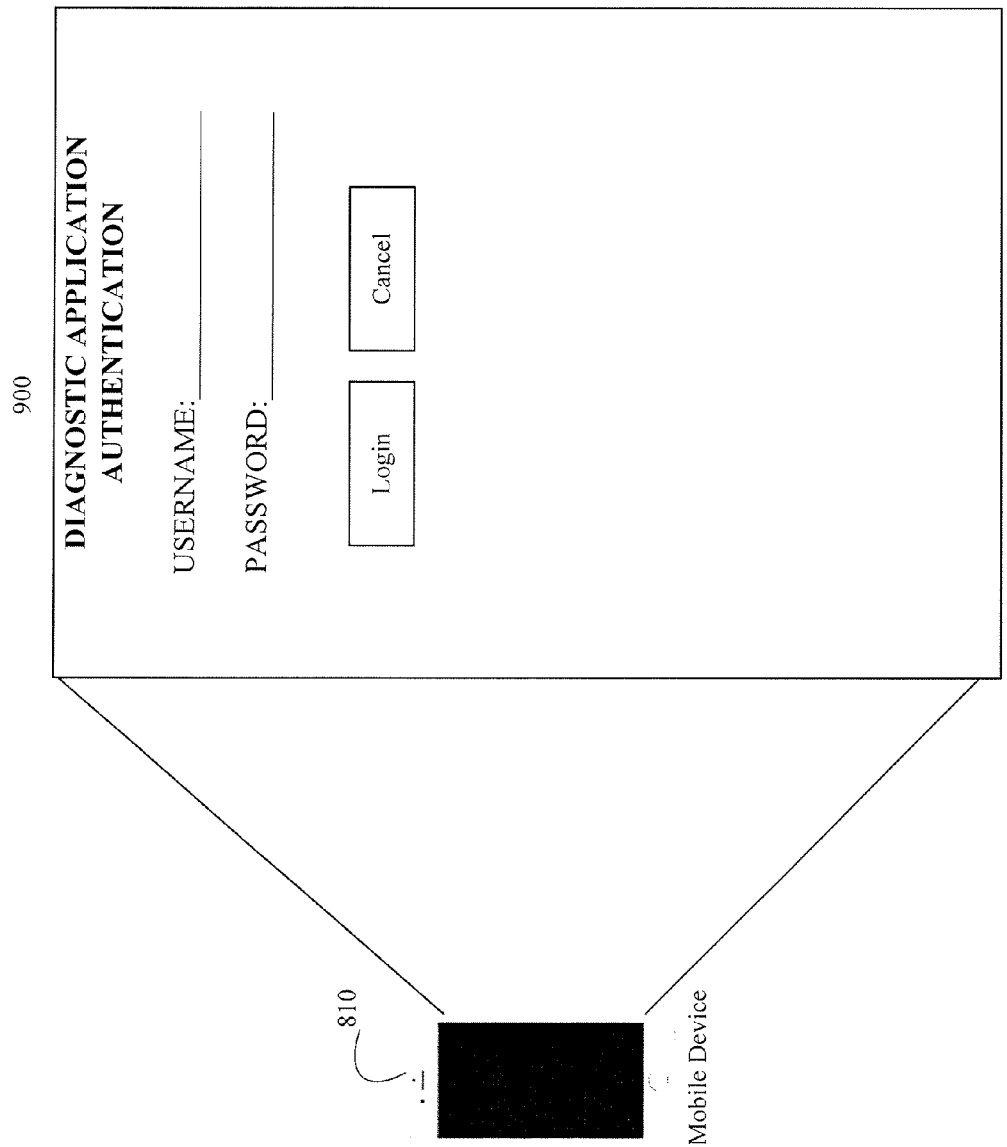

FIG. 9D

DIAGNOSTIC APPLICATION RESULTS

CPU ACTIVITY:

RX from 0x001E: nLight 0x01 0x01 0x00  ← Message from switch
Tx Mcast cmd 0x01 0x00 0x00, cntr 0xC7  ← Broadcast it to the group
Ucast FLWUP to 0x0014                    ← Guaranteed follow-up to
each node
send to myself
Ucast FLWUP to 0x0015
Ucast FLWUP to 0x0016
Ucast FLWUP to 0x0017
Ucast FLWUP to 0x0018
Ucast FLWUP to 0x0019
 Ledcode 0x00E8                          ← Light output ramping
down
Ucast FLWUP to 0x001B
Ucast FLWUP to 0x001C
Ucast FLWUP to 0x001D
Mcast follow-up done(0xC7), 4
 Ledcode 0x00CB
 Ledcode 0x00B1
 Ledcode 0x0094
 Ledcode 0x0072
 Ledcode 0x0050
 Ledcode 0x002E
 Ledcode 0x0019
 Ledcode 0x0000                          ← Light off

810

Mobile Device

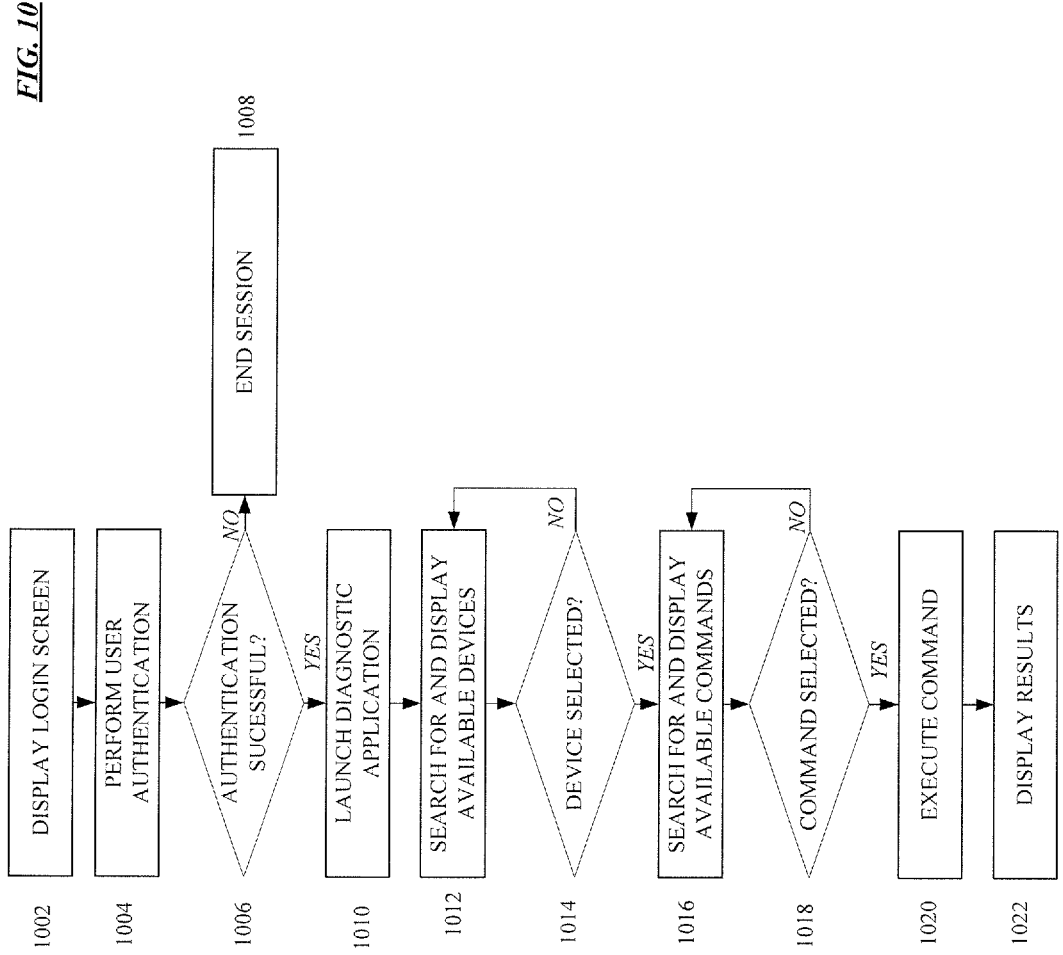

SECONDARY RADIO FOR DIAGNOSTIC/DEBUG

BACKGROUND

Conventional wireless lighting control systems automate the operation of the luminaires throughout a building or residence based upon preset time schedules, occupancy, and/or daylight sensing. Such lighting control systems receive sensor signals at a central lighting control panel, which responds to the received signals by deciding which, if any, relays, switching devices, and/or dimming ballasts to drive in order to turn on or off and/or adjust the light levels of one or more luminaires.

A method of diagnosing device, setting and/or programming issues (e.g. network, radio frequency, etc.) using a wireless communication link is important, because devices (e.g. luminaires, wall switches, sensors, etc.) may develop operational problems which may require performing maintenance operations and/or modifying operational configuration. In order to receive diagnostic information from the devices in these conventional systems, however, a user (e.g. usually a technician) would have to perform some sort of manual observation of the wireless network in question or plug a physical cable to a diagnostic port on a device. This can be time consuming and require special hardware. For example, in order to download diagnostic information for a wireless network, the technician would have to go to the site in question, and physically connect an analyzer to each and every device in question using wires (e.g. USB). Accordingly, a system is needed to overcome these and other limitations in the art.

SUMMARY

In an example, a system for lighting control includes a monitor device, and a plurality of lighting system components each configured as a luminaire or as a lighting control device for controlling a luminaire. The monitor device including a wireless radio communication interface system configured for wireless communication over a diagnostic band, a processor, a memory accessible to the processor, and programming in the memory which configures the processor to transmit a diagnostic command including a request for diagnostic data to at least one of the plurality of lighting system components. The plurality of lighting system components, each including a wireless radio communication interface system configured for wireless communication over the diagnostic band and a separate wireless lighting control network communication band, a processor, a memory accessible to the processor, and programming in the memory which configures the processor to receive via the wireless radio communication interface over the diagnostic band, the diagnostic command transmitted from the monitor device, and in response to receiving the diagnostic command, obtain the requested diagnostic data, and transmit via the wireless radio communication interface over the diagnostic band, the requested diagnostic data to the monitor device.

In an example, a lighting control device includes a wireless radio communication interface system configured for wireless communication over both a diagnostic band and a separate wireless lighting control network communication band. The lighting control device includes at least one of: a) sensing circuitry to detect a state change of an occupancy, audio, or daylight sensor, or a switch to turn lighting on/off, dim up/down, or set scene; or b) a power switch to turn on/off power supplied to other devices. In addition, the lighting control device includes a processor coupled to the at least one of the sensing circuitry or the power switch, a memory accessible to the processor; and programming in the memory which configures the processor to receive via the wireless radio communication interface over the diagnostic band, a diagnostic command from a monitor device. In one example, the diagnostic command includes a request for diagnostic data from the lighting control device. In response to receiving the diagnostic command, the lighting control device obtains the requested diagnostic data, and transmits via the wireless radio communication interface over the diagnostic band, the requested diagnostic data to the monitor device.

In an example, a luminaire includes a wireless radio communication interface system configured for wireless communication over both a diagnostic band and a separate wireless lighting control network communication band, a processor, a memory accessible to the processor, and programming in the memory. In one example, the programming configures the processor to receive via the wireless radio communication interface over the diagnostic band, a diagnostic command from a monitor device. The diagnostic command includes a request for diagnostic data from the luminaire. In response to receiving the diagnostic command, the luminaire obtains the requested diagnostic data, and transmits via the wireless radio communication interface over the diagnostic band, the requested diagnostic data to the monitor device.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 3A-C are block diagrams of luminaires that communicate via the lighting control system of FIG. 1B or FIG. 1C.

FIGS. 5A-C are block diagrams of plug load controllers that communicate via the lighting control system of FIG. 1B or FIG. 1C.

FIGS. 9A-D are examples of screenshots of a mobile application for controlling the devices of the lighting control system of FIGS. 1B and 1C.

FIG. 10 is a flowchart showing the operation of the mobile device and lighting devices of the lighting control system of FIGS. 1B and 1C.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference now is made in detail to the examples illustrated in the accompanying drawings and discussed below.

Figure 1A:
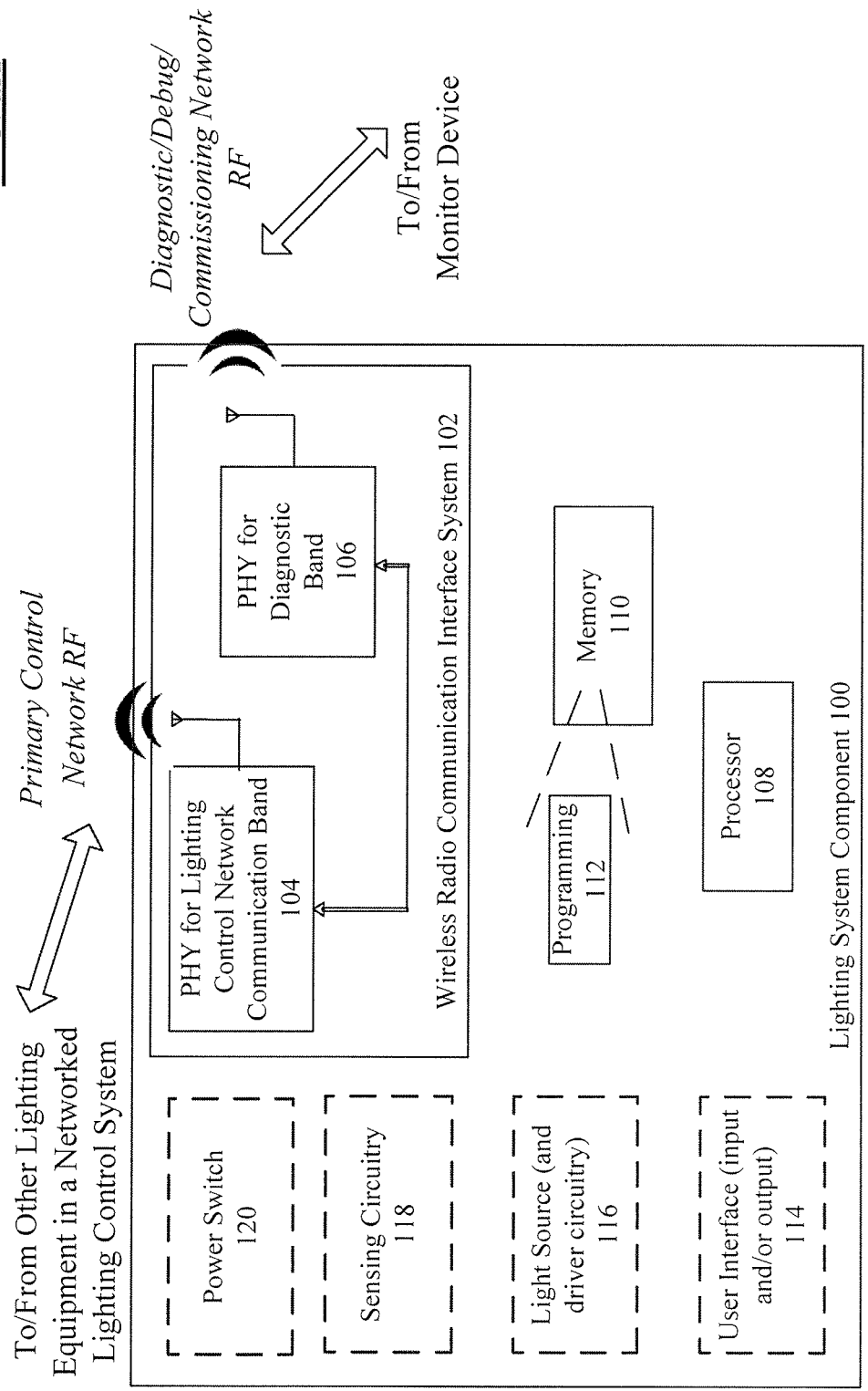
FIG. 1A is a functional block diagram of a lighting network component, such as a luminaire, sensor or user interface device such as a wall switch of control panel, with dual band communication capabilities.

FIG. 1A shows is a high-level functional block diagram of an example of a lighting system component that may be configured as a luminaire or a lighting control device. In general, the lighting system component 100 includes a wireless radio communication interface system 102 having a control network transceiver 104 (e.g. 900 Mhz), in the example, a physical layer circuit (PHY) circuit for RF communication over that frequency band. Components 100 communicate over this first band for controlling network devices over the primary control network RF. The wireless radio communication interface system 102 includes a diagnostic band transceiver 106 (e.g. Bluetooth), in the example PHY layer transceiver circuit for communication in that second band. The component 100 uses the second band for receiving diagnostic commands and for transmitting diagnostic information to a diagnostic monitor device (e.g. smartphone or network computer). Lighting system component 100 also includes a processor 108, memory 110 having programming 112 stored thereon for execution by processor 108, an optional user interface 114 (e.g. touchscreen, buttons, indicators, etc.), an optional light source (e.g. LED) 116, an optional sensing circuit 118 (e.g. infrared sensor, etc.), and an optional power switch 120 (e.g. power relay) among others. Although not shown, the devices internal to lighting system component 100 are interconnected with each other.

Lighting system component 100 may generally be configured as one of two distinct types of devices. In one example, lighting system component 100 may be configured as a lighting control device (e.g. wall switch, power pack, sensor, plug load controller, etc.). In another example, lighting system component 100 may be configured as a luminaire (e.g. an LED light).

When lighting system component 100 is configured as a lighting control device it includes a wireless radio communication interface system 102 configured for wireless communication over both a diagnostic band 106 and a separate wireless lighting control network communication band 104. The lighting control device includes at least one of: a) sensing circuitry 118 to detect a state change of an occupancy, audio, or daylight sensor, or a switch to turn lighting on/off, dim up/down, or set scene; or b) a power switch 120 to turn on/off power supplied to other devices. In addition, the lighting control device includes a processor 108 coupled to the at least one of the sensing circuitry or the power switch, a memory 110 accessible to the processor; and programming 112 in the memory which configures the processor to receive via the wireless radio communication interface over the diagnostic band 106, a diagnostic command from a monitor device. In one example, the diagnostic command includes a request for diagnostic data from the lighting control device. In response to receiving the diagnostic command, the lighting control device obtains the requested diagnostic data, and transmits via the wireless radio communication interface over the diagnostic band 106, the requested diagnostic data to the monitor device.

When lighting system component 100 is configured as a luminaire, it includes a wireless radio communication interface system 102 configured for wireless communication over both a diagnostic band 106 and a separate wireless lighting control network communication band 104, a processor 108, a memory 110 accessible to the processor, and programming 112 in the memory. In one example, the programming configures the processor 108 to receive via the wireless radio communication interface over the diagnostic band 106, a diagnostic command from a monitor device. The diagnostic command includes a request for diagnostic data from the luminaire. In response to receiving the diagnostic command, the luminaire obtains the requested diagnostic data, and transmits via the wireless radio communication interface over the diagnostic band 106, the requested diagnostic data to the monitor device.

Figure 1B:
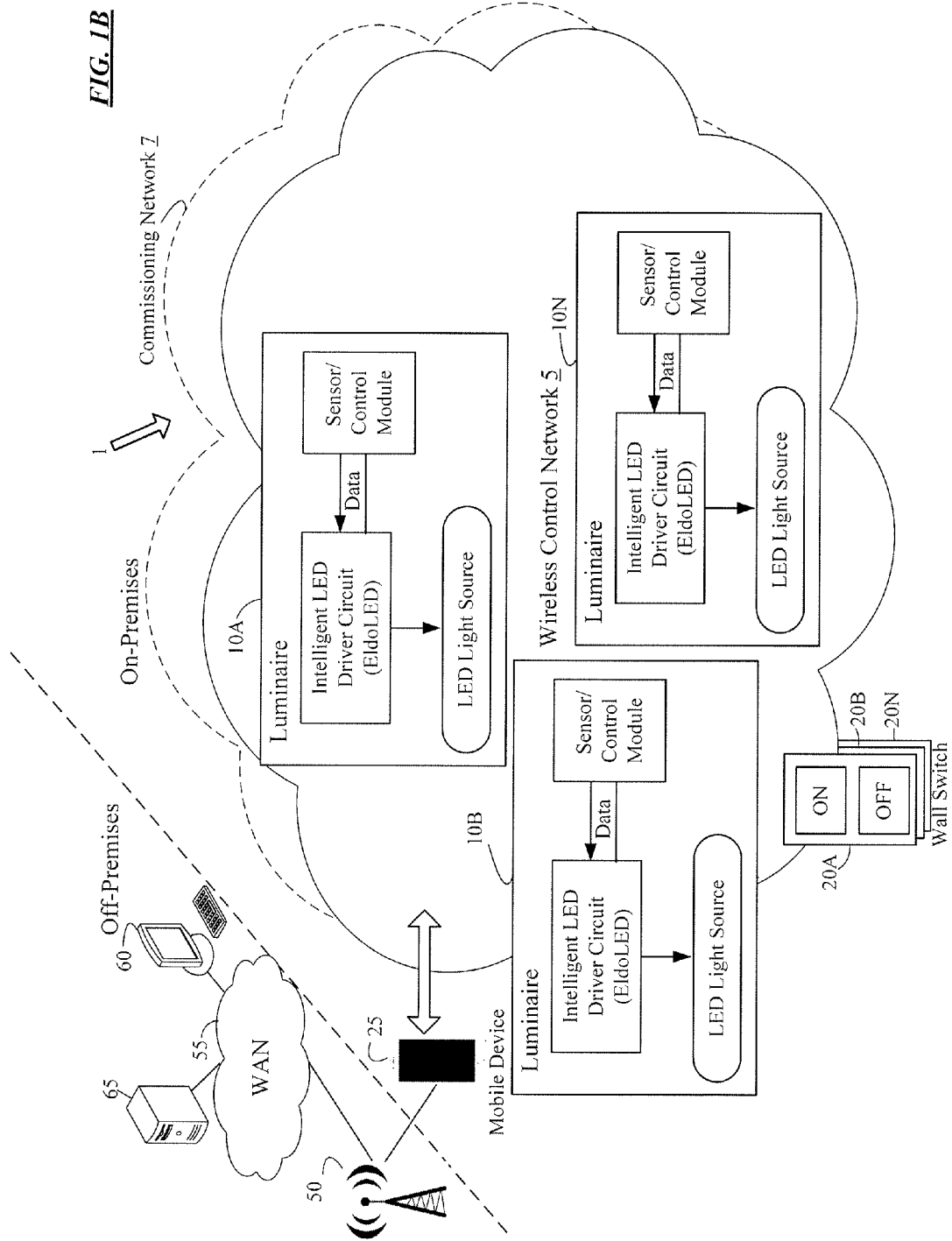
FIG. 1B is a high-level functional block diagram of an example of a system of networks and devices that provide a variety of lighting controls, including communications in support of turning lights on/off, dimming, set scene, and sensor trip events.
Figure 1C:
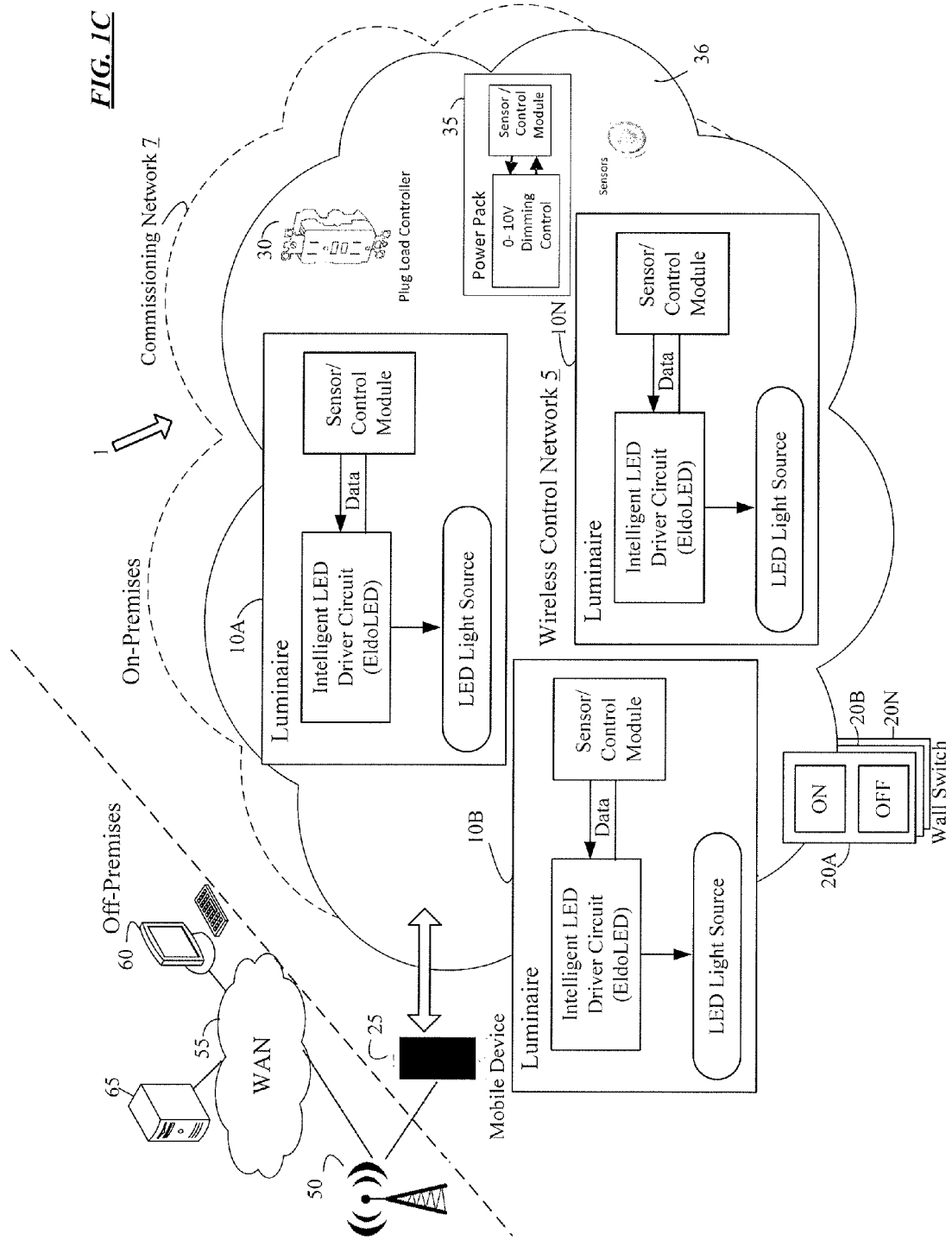
FIG. 1C is another high-level functional block diagram of an example of a system of networks and devices that further includes plug load controller and power pack devices.

FIGS. 1B and 1C are functional block diagrams illustrating examples, each relating to a system of networks and devices (e.g. lighting control devices and luminaires) that provide a variety of lighting control capabilities, including communications in support of turning lights on/off, dimming, set scene, and sensor trip events. FIG. 1C is the same as FIG. 1B, but further includes additional lighting control devices (LCDs): a plug load controller 30 and a power pack 35.

For purposes of illustration, it should be understood that the term "lighting control device" means a device (e.g. the wall switch, plug load controller, power pack and sensor shown in FIGS. 4A-C, 5A-C, 6A-C, and 7A-C respectively) that includes a controller that executes a lighting application for communication over a wireless lighting control network communication band in order to control a lighting device. The term "lighting device" means a device (e.g. the luminaire in FIGS. 3A-C) that includes a controller that executes a lighting application for communication over a wireless lighting control network communication band in order to control the emission of light based on signals received from the lighting control device. The term "monitor device" means a device (e.g. mobile phone in FIG. 2) that includes a controller that executes a lighting application for communication over a wireless lighting control network communication band in order to monitor and control operation of both the lighting device and the lighting control device.

The lighting control system 1 may be designed for indoor commercial spaces. As shown, system 1 includes a variety of lighting control devices, such as a set of luminaires 10A-N (lighting fixtures) and a set of wall switches 20A-N. Daylight, occupancy, and audio sensors are embedded in lighting control devices, in this case luminaires 10A-N to enable controls for occupancy and dimming.

Luminaires 10A-N, wall switches 20A-N, plug load controller 30, and power pack 35 communicate control over a 900 MHz (sub-GHz) wireless control network 5 and accordingly each include a first radio in the sub-GHz range. A variety of controls are transmitted over wireless control network 5, including, for example, turn lights on/off, dim up/down, set scene (e.g., a predetermined light setting), and sensor trip events. Each luminaire 10A-N, wall switch 20A-N, plug load controller 30, and power pack 35, is also equipped with a second near range Bluetooth Low Energy (BLE) radio that communicate over commissioning network 7 for purposes commissioning and maintenance the wireless lighting control system 1, however no controls pass over this commissioning network 7.

Plug load controller 30 plugs into existing AC wall outlets, for example, and allows existing wired lighting devices, such as table lamps or floor lamps that plug into a wall outlet, to operate in the lighting control system 1. The plug load controller 30 instantiates the table lamp or floor lamp by allowing for commissioning and maintenance operations and processes wireless lighting controls in order to the allow the lighting device to operate in the lighting control system 1.

Power pack 35 retrofits with existing wired light fixtures (luminaires). The power pack 35 instantiates the wired light fixture by allowing for commissioning and maintenance operations and processes wireless lighting controls in order to allow the lighting device to operate in the lighting control system 1.

Both plug load controller 30 and power pack 35 can include the same circuitry, hardware, and software as light fixtures 10A-N and wall switches 20A-N. Sensor 36 may be any type of sensor for controlling operation of the luminaire. For example, sensor 36 may detect, ambient light, sound, infrared light, etc. These detections may then be used to control the ON/OFF cycle of the luminaire.

System 1 is provisioned with a mobile device 25 that includes an application 22 for performing commissioning, maintenance and diagnostics functions of the lighting control system 1. For example, mobile device 25 enables mobile commissioning, configuration, diagnostics and maintenance functions and can be a PDA or smartphone type of device with human interfacing mechanisms sufficient to perform clear and uncluttered user directed operations. Mobile device 25 runs mobile type applications on iOS7, Android KitKat, and windows 10 operating systems and application 22 to support commissioning.

The application performs diagnostic functions of the lighting control system 1. For example, mobile device 25 is able to act as a monitor device by communicating directly with the lighting devices, and lighting control devices (e.g. via BlueTooth). Mobile device 25 can request diagnostic information from these devices, and additionally control/set their operational parameters.

Figure 2:
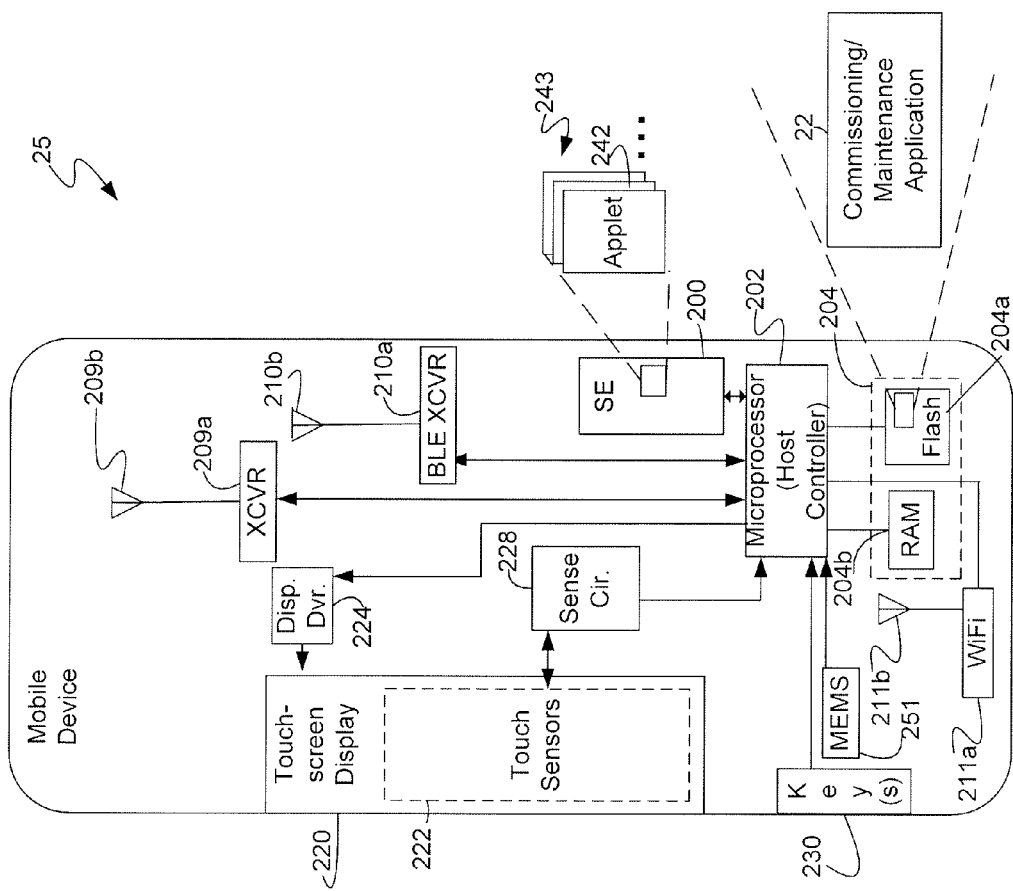
FIG. 2 is a high-level functional block diagram of a mobile device of the lighting control system of FIGS. 1B and 1C.

It should be noted that although mobile device 25 is shown as a smartphone in FIGS. 1 and 2, that mobile device 25 may be any type of device (e.g. laptop computer, tablet computer, PDA, etc.) that can communicate directly with the lighting control devices and luminaires. In addition, mobile device 25 may not even be mobile. For example, mobile device 25 can be a personal computer (PC), wireless access point, or any other device that can communicate directly with the lighting control devices and luminaires (e.g. via Bluetooth).

Web enabled (cloud) services for facilitating commissioning and maintenance activities is also provided by mobile device 25. The application 22 of mobile commissioning device 25 interfaces with the cloud services to acquire installation and configuration information for upload to luminaires 10A-N, wall switches 20A-N, plug load controller 30, and power pack 35. The installation and configuration information is received by mobile device 25 from a gateway (not shown) or through mobile device 25. The gateway or mobile device 25 engages in communication through the wide area network (WAN) 55.

Lighting control system 1 can leverage existing sensor and fixture control capabilities of Acuity Brands Lighting's commercially available nLight® wired product through firmware reuse. In general, Acuity Brands Lighting's nLight® wired product provides the lighting control applications. However, the illustrated lighting control system 1 includes a communications backbone and includes model—transport, network, media access control (MAC)/physical layer (PHY) functions. The sub-GHz communications of the wireless control network 5 features are built on a near 802.15.4 MAC and PHY implantation with network and transport features architected for special purpose control and air time optimizations to limit chatter.

The lighting control system 1 can be deployed in standalone or integrated environments. System 1 can be a an integrated deployment, or a deployment of standalone groups with no gateway. One or more groups of lighting control system 1 may operate independently of one another with no backhaul connections to other networks.

Lighting control system 1 may comprise a mix and match of various indoor systems, wired lighting systems (nLight® wired), emergency, and outdoor (dark to light) products that are networked together to form a collaborative and unified lighting solution. Additional control devices and lighting fixtures, for backhaul connection, time sync control, data collection and management capabilities, and interoperation with the Acuity Brands Lighting's commercially available SensorView product may also be provided.

As shown in FIG. 1C, control, configuration, and maintenance operations of the lighting control system 1 involve networked collaboration between the luminaires 10A-N, wall switches 20A-N, plug load controller(s) 30, and power pack(s) 35. The lighting control devices subscribe to channels and only listen for/react to messages on the RF channel with the identifier (ID). The wireless control network 5 distributes control messages and events, network management messages and events, health and failover events, and commissioning and maintenance communications, such as firmware update distributions.

Wireless control network 5 provides a secure control network (Sub-GHz) on which to operate. Devices are manually added to the wireless control network 5 via the commissioning process via commissioning/maintenance application of mobile device 25. The commissioning process includes authorization and authentication features that allow only trusted and known entities to add confirmed devices 10A-N, 20A-N, 30, 35, 36 to the network. Requirements relating to network modification (device add/delete/modify)

are allocated to the mobile device 25 and its interface (commissioning/maintenance/diagnostics application) to the lighting control system 1.

Message authentication in the lighting control system 1 is provided by the 802.15.4 compliant MAC layer solution commercially available from Silicon Labs. The solution uses the AES CCM block cypher mode of operation to secure over the air frames. The mode of operation provides NIST compliant authentication, encryption, and integrity assurance to defeat replay attacks as well as device and message spoofing.

Lighting control system 1 also implements an additional layer of authentication by performing checks on the message source and addressing mechanisms to reject messages from unknown sources. The sub-GHz MAC/PHY (wireless control network 5) thus provides secure communication features (authentication, data integrity, and encryption assurance) based on the 802.15.4 standard.

The lighting control devices, luminaires and mobile device over the wireless control network 5 together may engage in any-to-many (unicast and multicast) communication and can implement a non-mesh wireless network topology. In our example, wireless control network 5 is a star topology network. Although other network schemes may be utilized, a star topology may be the best fit for aligning the required control communications features with the characteristics of sub-GHz wireless radio.

Commissioning

Commissioning is the process that sets the lighting control configuration and settings that drive the behavior of the devices in lighting control system 1. One or more mobile devices 25 can be used to commission the installation of lighting control system 1. During setup, commissioning/maintenance application of the mobile device 25 provides a secure method for a system installer to configure the lighting control devices (LCDs) for installation commissioning. The lighting control devices include luminaires 10A-N, wall switches 20A-N, plug load controller 30, and power pack 35.

General behavioral settings and network addressing information are stored on the mobile device 25 for upload and allocation to the installation's lighting control devices via commissioning/maintenance/diagnostics application. The installation information is managed by commissioning/maintenance/diagnostics application of mobile device 25 to ensure correctness and to eliminate common errors such as assignment of duplicate network addresses.

Communication between the mobile device 25 for commissioning/maintenance/diagnostics, the luminaires, and the lighting control devices is over the commissioning network 7, such as a BLE network. The lighting control devices are initially in an installation state, beaconing their advertisements when the commissioning starts.

Upon connection with the mobile device 25, the commissioning/maintenance application of mobile device 25 transitions the lighting control devices to a commissioning state. Further upon connection, the lighting control device authenticates the mobile device 25 and is ready to accept commands over the commissioning network 7. The wall switches 20A-N suppress sleep mode until completion of the commissioning process and transition to operational mode. Wall switches 20A-N will re-enter sleep mode if the commissioning process is interrupted—two elapsed hours with no activity.

An installation may be commissioned according to lighting control groups. A group is a collection of LCDs sharing the same space within an installation (e.g. a room or area). Generally, the lighting control network 5 is established over a 802.15.4 based MAC riding on top of a sub-GHz (904 MHz to 926 MHz) PHY. The commissioning network 7, such as a Bluetooth Low Energy MAC/PHY, is used to as the point to point connection medium to transfer control network configuration from the application of the mobile device 25 to a lighting control device or luminaire. The application of mobile device 25 builds a network table of the group devices while establishing the lighting control network 5. The network table, used by the group monitor in the execution of its responsibilities, is uploaded from the mobile device 25 to the lighting control devices and luminaires via application.

Each lighting control device also has a behavioral configuration. The configuration is specified by a group of settings that define control characteristics such as sensor set points, delays, modes, and ranges. The control characteristics also specify independent zones of control within the group. These characteristics and settings are customized as necessary and uploaded from the mobile device 25 to each lighting control device via commissioning/maintenance application.

During the commissioning process, line powered lighting control devices are installed, powered, and advertising over BLE. Battery powered lighting control devices, such as wall switches 20A-N, are installed and in sleep mode to conserve power. After the mobile device 25 is setup, an installer opens the application on the mobile device 25 and walks into an area of the installation that is ready to commission as a lighting control group.

Mobile Device

FIG. 2 is a high-level functional block diagram of a mobile device 25 for commissioning and maintenance of the lighting control system of FIGS. 1B and 1C. Shown are elements of a touch screen type of mobile device 25 having the application 22 for commissioning, maintenance and diagnostics loaded, although other non-touch type mobile devices can be used in the prior token-based communications under consideration here. Examples of touch screen type mobile devices that may be used include (but are not limited to) a smart phone, a personal digital assistant (PDA), a tablet computer or other portable device. However, the structure and operation of the touch screen type devices 25 is provided by way of example; and the subject technology as described herein is not intended to be limited thereto. For purposes of this discussion, FIG. 2 therefore provides a block diagram illustration of the example of mobile device 25 having a touch screen display for displaying content and receiving user input as (or as part of) the user interface.

The activities that are the focus of discussions here typically involve data communications. As shown in FIG. 2, the mobile device 25 includes a first digital transceiver (XCVR) 209a, for digital wireless communications via a wide area wireless mobile communication network and second digital XCVR 210a for digital wireless communications via a Bluetooth network, although the mobile device 25 may include additional digital or analog transceivers (not shown).

The transceiver 210a (network communication interface) conforms to one or more of the various digital wireless communication standards for Bluetooth communications. As discussed previously, communications through the Bluetooth transceiver 210a and the commissioning network 7 shown in FIGS. 1B and 1C relate to protocols and procedures in support of commissioning and maintaining lighting control devices, including luminaires 10A-N, wall switches 20A-N, plug load controller 30, sensor 36, and power pack 35. In addition, communications to gateway (not shown) are also supported. Such communications, for example, may utilize IP packet data transport utilizing the digital wireless transceiver (XCVR) 210a and over the air communications via commissioning network 7 shown in FIGS. 1B and 1C.

Transceiver 210a connects through radio frequency (RF) send-and-receive amplifiers (not shown) to an antenna 210b.

The transceiver 209a (network communication interface) conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, transceiver 209a provides two-way wireless communication of information including digitized audio signals, still image and/or video signals, web page information for display as well as web related inputs, and various types of mobile message communications to/from the mobile device 25.

In one example, the transceiver 209a sends and receives a variety of signaling messages in support of various data services provided by a network of a wireless service provider, to user(s) of mobile device 25 via a mobile communication network (not shown). Transceiver 209a also connects through radio frequency (RF) send-and-receive amplifiers (not shown) to an antenna 809b.

Many modern mobile device(s) 25 also support wireless local area network communications over WiFi, instead of or in addition to data communications using the wide area mobile communication network. Hence, in the example of FIG. 2, for packet data communications, mobile device 25 may also include a WiFi transceiver 211a and associated antenna 211b. Although WiFi is used here as the example, the transceiver 211a may take the form of any available two-way wireless local area network (WLAN) transceiver of a type that is compatible with one or more standard protocols of communication implemented in wireless local area networks, such as one of the WiFi standards under IEEE 802.11 and/or WiMAX.

The transceiver 211a, for example, may provide two-way data transport for wireless communication with a wireless access point in a residence or enterprise that the user frequents or with any available hotspot offered in a public venue. A WiFi access point (not shown), communicates with compatible user equipment, such as the mobile device 25, over the air using the applicable WiFi protocol. The WiFi access point provides network connectivity, usually to a wide area network 55 (as shown in FIGS. 1B and 1C), such as the Internet. In a home or office premises, for example, the WiFi access point would connect directly or via a local area network (LAN) to a line providing internet access service. In a more public venue, an access point configured as a hotspot may offer similar connectivity for customers or others using the venue, on terms and conditions set by the venue operator. Although communicating through a different network or networks, the transceiver 211a supports various types of data communications similar to the packet data communications supported via the mobile network transceiver 209a, including communications to and from the other devices shown in FIGS. 1B and 1C.

The mobile device 25 further includes a microprocessor, sometimes referred to herein as the host controller 202. A processor 202 is a circuit having elements structured and arranged to perform one or more processing functions, typically various data processing functions. Although discrete logic components could be used, the examples utilize components forming a programmable CPU. A microprocessor 202 for example includes one or more integrated circuit (IC) chips incorporating the electronic elements to perform the functions of the CPU. The processor 202, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in mobile device 25, other devices (PC 60) and server computers (e.g., server 65), network elements, etc.

Returning more specifically to the mobile device 25 example of FIG. 2, the microprocessor 202 serves as a programmable host controller for mobile device 25 by configuring device 25 to perform various operations, for example, in accordance with instructions or programming executable by processor 202. For example, such operations may include various general operations of the mobile device 25, as well as operations related to communications with luminaires 10A-N, wall switches 20A-N and other lighting control devices during commissioning and maintenance performed by the commissioning/maintenance application 22. Although a processor may be configured by use of hardwired logic, typical processors in mobile devices are general processing circuits configured by execution of programming.

The mobile device 25 includes a memory or storage system 204, for storing data and programming. In the example, the memory system 204 may include a flash memory 204a and a random access memory (RAM) 204b. The RAM 204b serves as short term storage for instructions and data being handled by the processor 202, e.g. as a working data processing memory. The flash memory 204a typically provides longer term storage.

Hence, in the example of mobile device 25, the flash memory 204a is used to store programming or instructions for execution by the processor 202. Depending on the type of device, the mobile device 25 stores and runs a mobile operating system through which specific applications, including commissioning/maintenance application 22 (which may be a web browser executing a dynamic web page) or a native application, run on the mobile device 25. Examples of mobile operating systems include Google Android, Apple iOS (I-Phone or iPad devices), Windows Mobile, Amazon Fire OS, RIM BlackBerry operating system, or the like. Flash memory 204a may also be used to store mobile configuration settings for different mobile applications or services executable at device 25 using processor 202.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions or programming may be used to implement any other device functions associated with communications for commissioning and maintenance on mobile device 25. Program aspects of the technology may be thought of as "products" or "articles of manufacture" typically in the form of executable code or process instructions and/or associated data that is stored on or embodied in a type of machine or processor readable medium (e.g., transitory or non-transitory), such as one of the memories 204a, 204b of memory system 204, or a memory of a computer used to download or otherwise install such programming into the mobile device, or a transportable storage device or a communications medium for carrying program for installation in the mobile device 25.

In the example, the flash memory 204a stores applications for execution by the microprocessor-based host controller 202, typically through operation/execution of the device operating system. Of note, for purposes of the present discussion, the flash memory 204 stores an application 22 as one of the programs for execution by the microprocessor 202. Execution of application 22 by the microprocessor 202 configures mobile device 25 to perform a variety of functions, particularly to commission, maintain and perform diagnostics on the lighting control devices over the commissioning network 7. In the example, commissioning/maintenance application 22 also engages in communications with the server 65 and PC 60 via cell tower 50.

In the illustrated example, the mobile device 25 includes a secure component 200. The secure component 200 (e.g. a secure element or "SE") may be provisioned as a section within the memory 204 or may take the form of a universal integrated circuit card (UICC) located within the device 25. A common example of a UICC implementation of the SE 200 is a subscriber identity module (SIM). As discussed above, the SE provides secure storage for various identifiers associated with mobile device 25. The SE typically has a unique identifier and is provisioned for operation of the mobile device 25 by storage of a mobile directory number (MDN) and/or mobile identification number (MIN) assigned to the device 25 by the carrier network operator.

The secure component contains applications that use secure keys running inside the secure processor. Although similar to other applications, the applications for the secure processor are sometimes smaller and sometimes referred to as applets 243. In an example, application 22 may be an applet residing in the SE 200. For example, there may be at least one applet 242 to engage in communications.

The mobile device 25 may include a variety of different types of physical user interface elements to interact with the application 22. For discussion purposes, in the mobile device 25 shown in FIG. 2, the physical user interface elements of device 20 includes a touch screen display 220 (also referred to herein as "touch screen 220" or "display 220") to support gestures. For output purposes, the touch screen 220 includes a display screen, such as a liquid crystal display (LCD) or the like. For input purposes, touch screen display 220 includes a plurality of touch sensors 222.

A keypad may be implemented in hardware as a physical keyboard of mobile device 25, and keys may correspond to hardware keys of such a keyboard. Alternatively, some or all of the keys 230 (and keyboard) of device 25 may be implemented as "soft keys" of a virtual keyboard graphically represented in an appropriate arrangement via touch screen display 220. The soft keys presented on the touch screen display 220 may allow the user of device 25 to invoke the same user interface functions as with the physical hardware keys for authentication purposes.

In general, touch screen display 220 and touch sensors 222 (and one or more keys 230, if included) are used to provide a textual and graphical user interface for the mobile device 25. In an example, touch screen display 220 provides viewable content to the user at device 25. Touch screen display 220 also enables the user to interact directly with the viewable content provided in the content display area, typically by touching the surface of the screen with a finger or an implement such as a stylus.

As shown in FIG. 2, the mobile device 25 also includes a sense circuit 228 coupled to touch sensors 222 for detecting the occurrence and relative location/position of each touch with respect to a content display area of touch screen display 220. In this example, sense circuit 228 is configured to provide processor 202 with touch-position information based on user input received via touch sensors 222. In some implementations, processor 202 is configured to correlate the touch position information to specific content being displayed within the content display area on touch screen display 220. The touch-position information captured by the sense circuit 228 and provided to processor 202 may include, but is not limited to, coordinates identifying the location of each detected touch with respect to the display area of touch screen display 220 and a timestamp corresponding to each detected touch position. Accordingly, the processor 202 may determine input of a phone number, a token, or menu identifiers selected during audible scripts, for example.

As described above, mobile device 25 includes a commissioning/maintenance application 22. This application also allows mobile device 25 to perform other functions for communicating with and controlling the luminaires and various lighting control devices. Specifically, application 22 has a diagnostic retrieval function and a parameter setting function that utilize Bluetooth transceiver 210a to communicate with the luminaires and various lighting control devices. Generally, mobile device 25 can use application 22 to request diagnostic information (e.g. processor activity, etc.) and change parameters (e.g. RF settings) if desirable. By using Bluetooth transceiver 210a rather than Wi-Fi transceiver 211a, the mobile device 25, luminaires and lighting control devices can communicate diagnostic information between each other without interrupting the control and operation of the devices (e.g. Bluetooth transceiver 210a is used for diagnostics, and Wi-Fi transceiver 211a is used for lighting control). Details of this diagnostic feature is described in later figures.

Luminaire

Figure 3A:
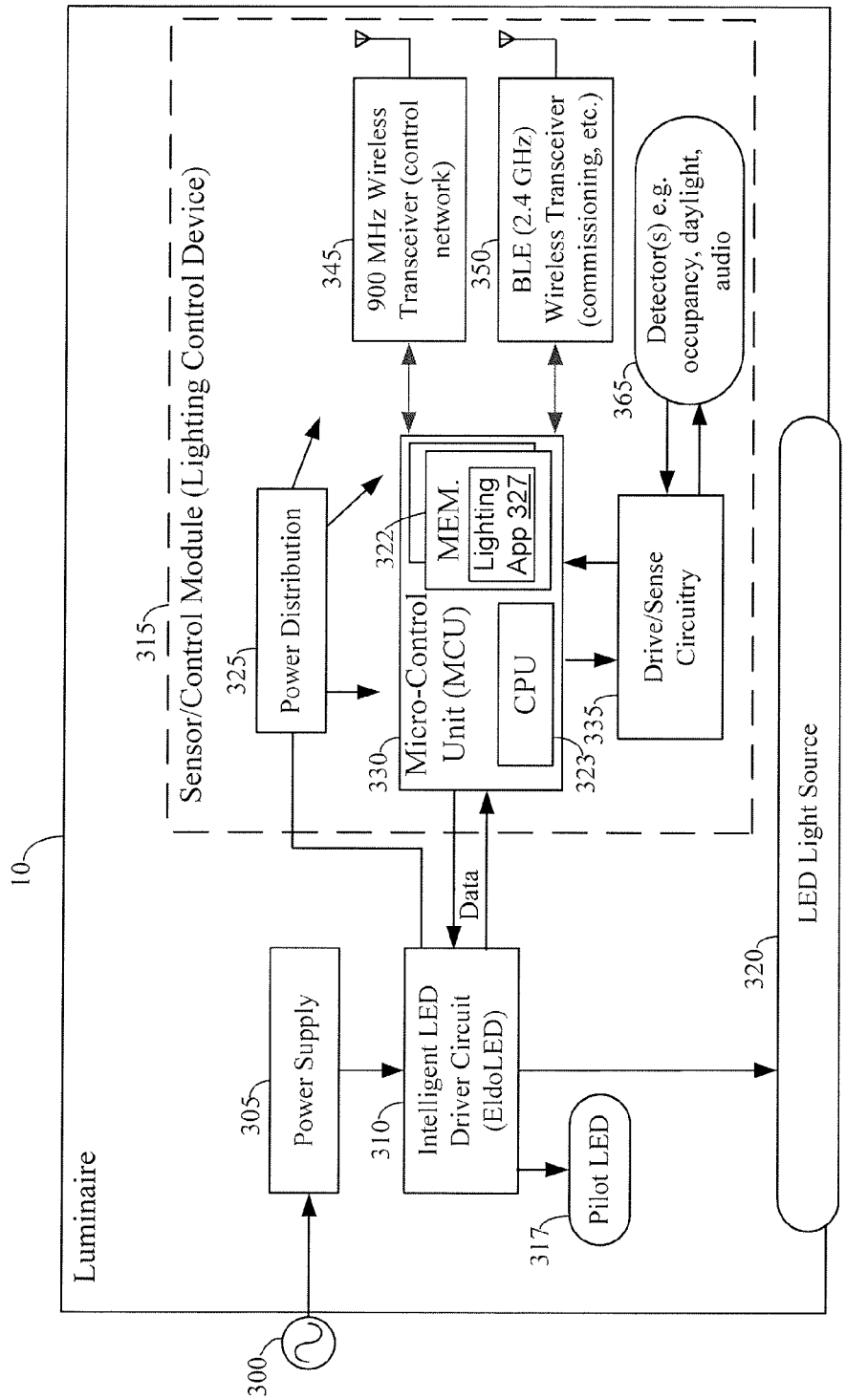
Figure 3C:
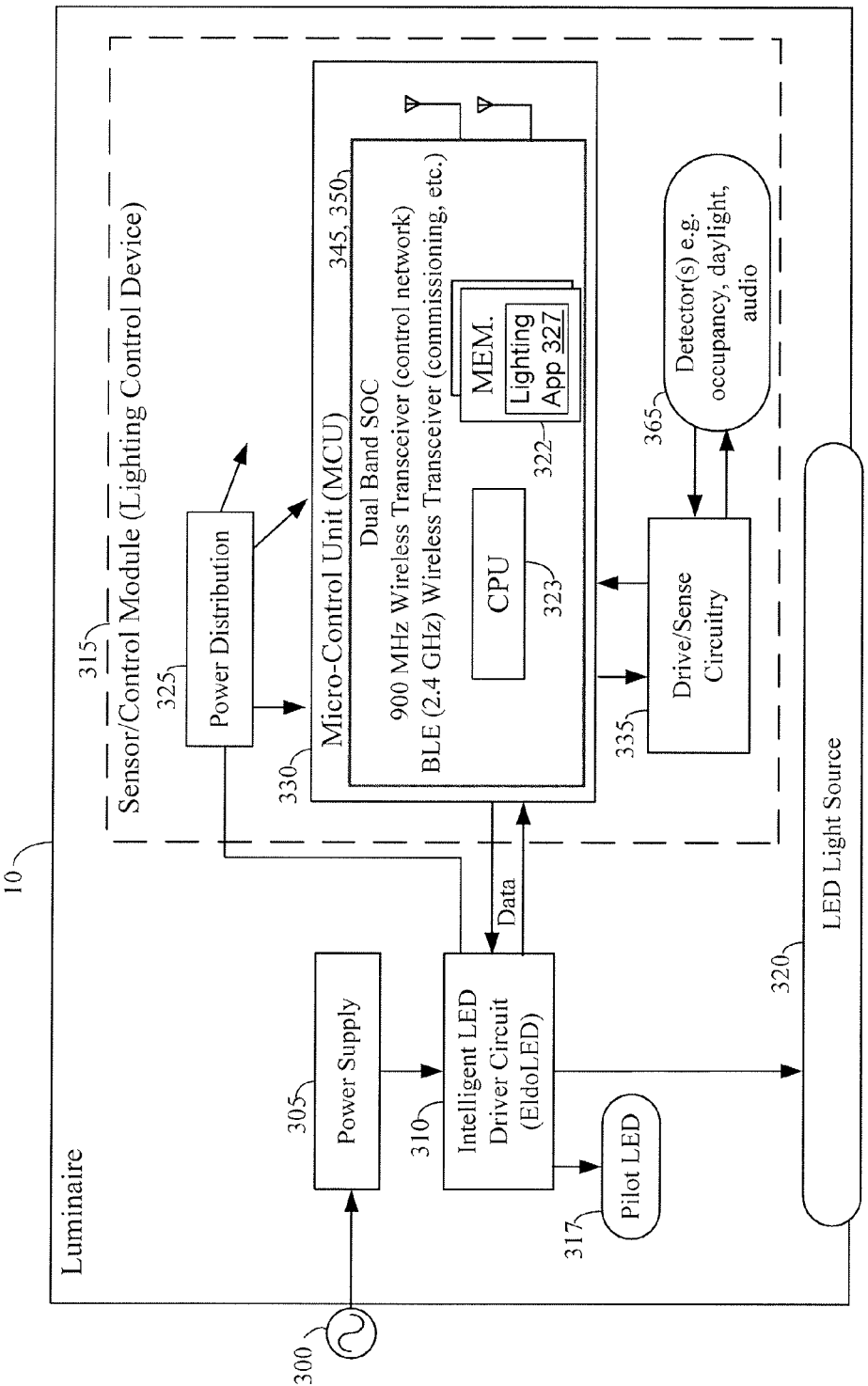

FIGS. 3A-C are block diagrams of a luminaire 10 that communicate via the lighting control system of FIGS. 1B and 1C. Luminaire 10 is an integrated light fixture that generally includes a power supply 305 driven by a power source 300. Power supply 305 receives power from the power source 300, such as an AC mains, battery, solar panel, or any other AC or DC source. Power supply 305 may include a magnetic transformer, electronic transformer, switching converter, rectifier, or any other similar type of circuit to convert an input power signal into a power signal suitable for luminaire 10.

Luminaire 10 furthers include an intelligent LED driver circuit 310, sensor/control module 315, and a light emitting diode (LED) light source 320. Intelligent LED driver circuit 310 is coupled to LED light source 320 and drives that LED light source 320 by regulating the power to LED light source 320 by providing a constant quantity or power to LED light source 320 as its electrical properties change with temperature, for example. The intelligent LED driver circuit 310 includes a driver circuit that provides power to LED light source 320 and a pilot LED 317. The pilot LED 317 may be included as part of the sensor/control module 315. Intelligent LED driver circuit 310 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 310 is manufactured by EldoLED.

LED driver circuit 310 can further include an AC or DC current source or voltage source, a regulator, an amplifier (such as a linear amplifier or switching amplifier), a buck, boost, or buck/boost converter, or any other similar type of circuit or component. LED driver circuit 310 outputs a variable voltage or current to the LED light source 320 that may include a DC offset, such that its average value is nonzero, and/or a AC voltage. The pilot LED 317 indicates the state of the luminaire 10, for example, during the commissioning and maintenance process.

For purposes of communication and control, luminaire 10 is treated as single addressable device that can be configured to operate as a member of one or more lighting control groups or zones. The luminaire 10 is line powered and remains operational as long as power is available.

Sensor/control module 315 includes power distribution circuitry 325, a micro-control unit (MCU) 330, drive/sense circuitry 335, and detector(s) 365. As shown, MCU 330 is coupled to LED driver circuit 310 and controls the light source operation of the LED light source 320. MCU 330 includes a memory 322 (volatile and non-volatile) and a central processing unit (CPU) 323. The memory 322 includes a lighting application 327 (which can be firmware) for both lighting control operations and commissioning, maintenance, and diagnostic operations. The power distribution circuitry 325 distributes power and ground voltages to the MCU 330, drive/sense circuitry 335, wireless transceivers 345 and 350, and detector(s) 365 to provide reliable operation of the various circuitry on the sensor/control module 315 chip.

Luminaire 10 also includes a dual-band wireless radio communication interface system configured for two way wireless communication. It should be understood that "dual-band" means communications over two separate RF bands. The communication over the two separate RF bands can occur simultaneously (concurrently); however, it should be understood that the communication over the two separate RF bands may not actually occur simultaneously. In our example, luminaire 10 has a radio set that includes radio 345 for sub-GHz communications and another radio 350 for Bluetooth RF communications (e.g. commissioning and diagnostics). A first transceiver 345, such as a 900 MHz wireless transceiver, issues control operations on the lighting control network. This first transceiver 345 is for any-to-many (unicast and multicast) communication, over a first of the two different wireless communication bands, of control and systems operations information, during luminaire operation and during control network operation over the first wireless communication band. Two transport methods ride on the network layer function of the first transceiver 345: unicast and multicast. The first transceiver 345 engages in multicast group communication of a one-to-many or a many-to-many distribution.

A second transceiver 350, such as a 2.4 GHz BLE (Bluetooth) wireless transceiver carries out commissioning, maintenance, and diagnostics of the lighting control network. This second transceiver 350 is for point-to-point communication, over a second of the two different wireless communication bands, of information other than the control and systems operations information, concurrently with at least some communications over the first wireless communication band.

As shown, the MCU 330 includes programming in the memory 322 which configures the CPU (processor) 323 to control operations of the respective luminaire 10, including the communications over the two different wireless communication bands via the dual-band wireless radio communication interface system 345, 350. The programming in the memory 322 includes a real-time operating system (RTOS) and further includes a lighting application 327 which is firmware/software that engages in communications with the application 22 of mobile device 25 over the commissioning network 7 of FIGS. 1B and 1C. The lighting application 327 programming in the memory 322 carries out lighting control operations over the lighting control network 5 of FIGS. 1B and 1C. The RTOS supports multiple concurrent processing threads for different simultaneous control or communication operations of the luminaire 10.

Three different CPU and memory architectures are shown for the sensor/control module 315 and the MCU 330 of the luminaire 10 in FIGS. 3A-C. In FIG. 3A, in addition to the memory 322 and the CPU 323 of the MCU 330 itself, the first transceiver 345 and the second transceiver 350 each include a separate memory (not shown) and a processor (not shown). Hence, in the example of FIG. 3A, the sensor/control module 15 includes a total of three processors and three sets of memory.

In FIG. 3B, the MCU 330 itself does not include a separate memory 322 and a CPU 323. Instead, only the first transceiver 345 and the second transceiver 350 each include a separate memory 322 and a processor 323. For efficiency purposes, such as to save manufacturing costs and conserve power (e.g., line power or battery power), the memory 322 and CPU 323 of the first transceiver 345 is selected to perform processing because the majority of processing (normal lighting control operations) occur over the sub-GHz wireless control network 5. Hence, in the example of FIG. 3B, the sensor/control module 315 includes a total of two processors and two sets of memory.

In FIG. 3C, the MCU 330 comprises a dual band system on chip (SOC) 345, 350 and the MCU 330 itself does not include a separate memory 322 and a CPU 323. Instead, the first transceiver 345 and the second transceiver 350 are integrated and combined into the chipset of the MCU 330. Hence, in the example of FIG. 3C, the sensor/control module 315 includes a total of one processor and one set of memory. Integrating the first transceiver 345 and second transceiver 350 into a dual band SOC chipset of the MCU 330, saves manufacturing costs and conserves power (e.g., line power or battery power).

As shown, luminaire 10 includes detector(s) 365, such as an in-fixture daylight sensor, an occupancy sensor, an audio sensor, a temperature sensor, or other environmental sensor. Detector(s) 365 may be based on Acuity Brands Lighting's commercially available xPoint® Wireless ES7 product. Drive/sense circuitry 335, such as application firmware, drives the in-fixture occupancy, audio, and photo sensor hardware. Outlined below are lighting controls and communications in the lighting control network that occur when drive/sense circuitry 335 of luminaire 10 detects state changes in the detector(s) 365, such as occupancy, daylight, and audio sensors.

Wall Switch

Figure 4A:
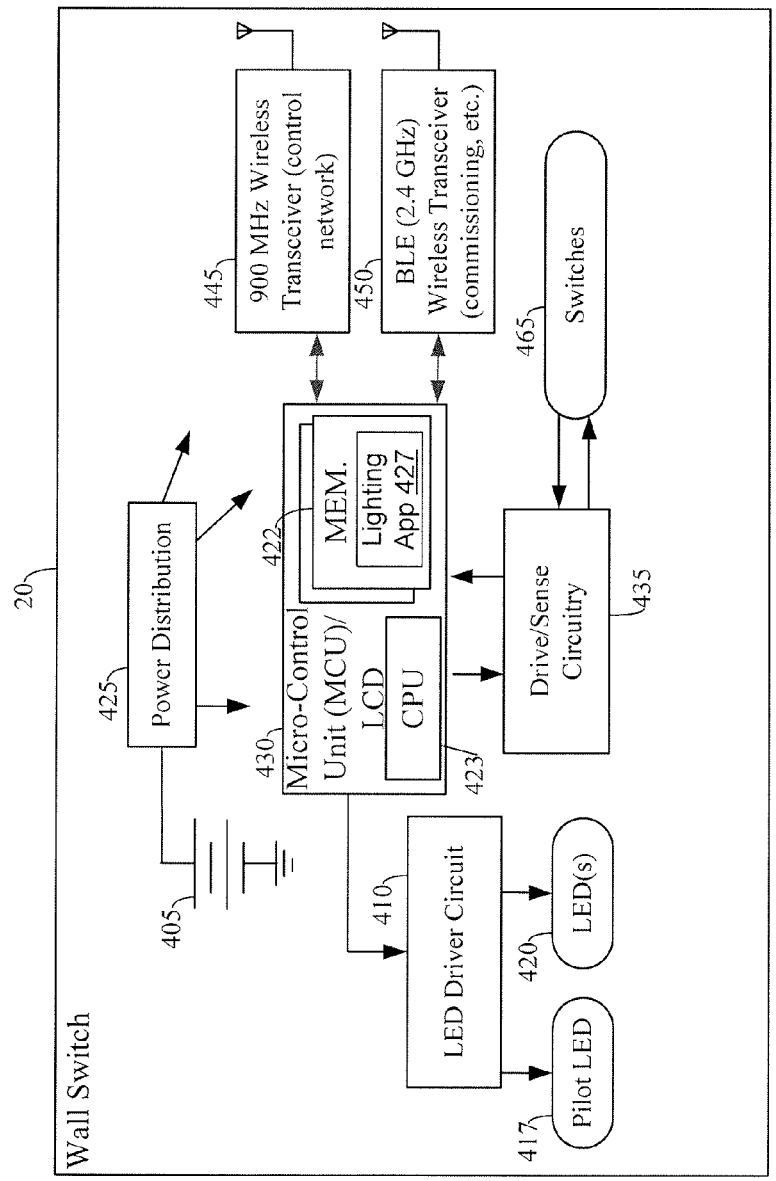
FIGS. 4A-C are block diagrams of wall switches that communicate via the lighting control system of FIG. 1B or FIG. 1C.
Figure 4B:
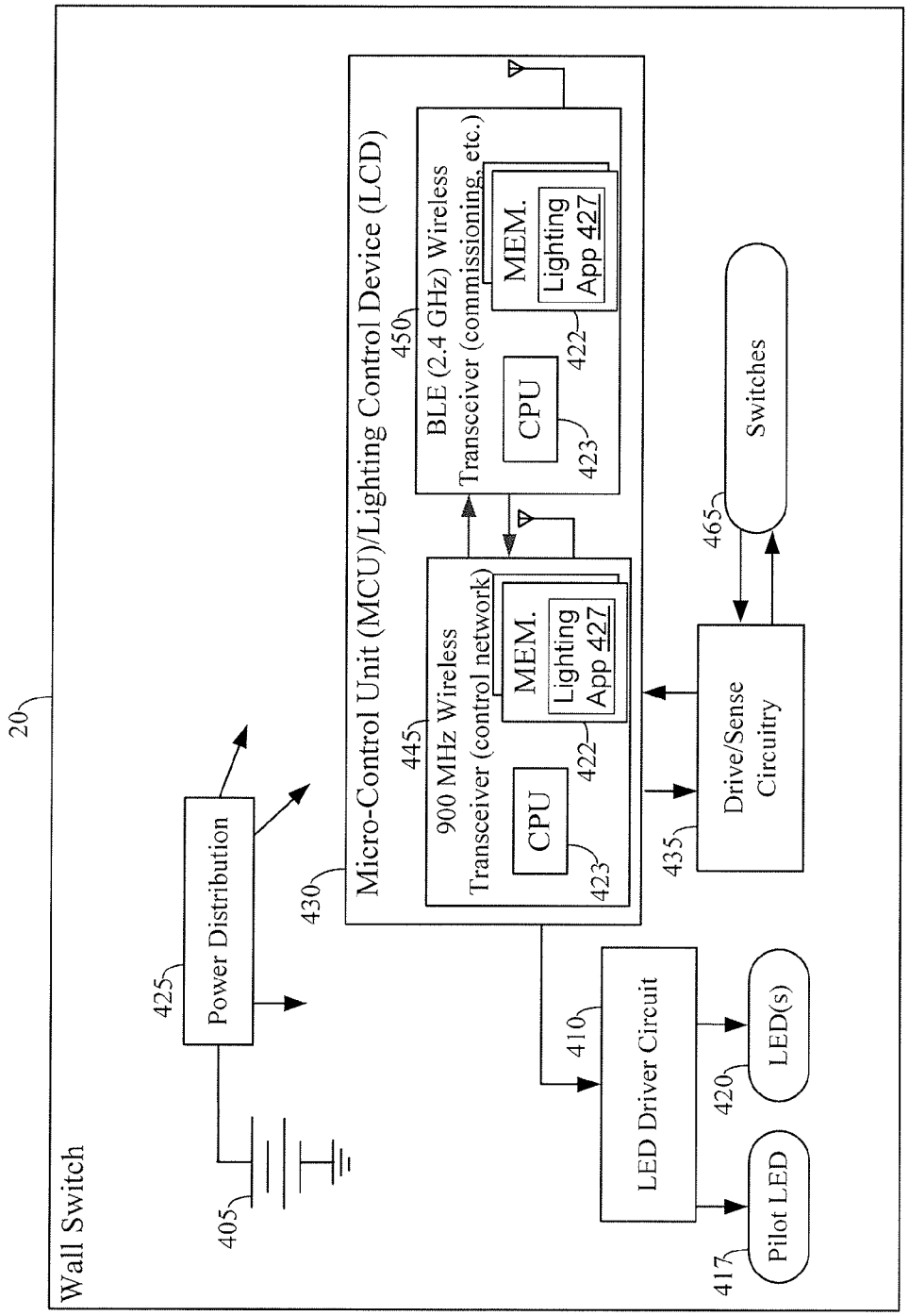
Figure 4C:
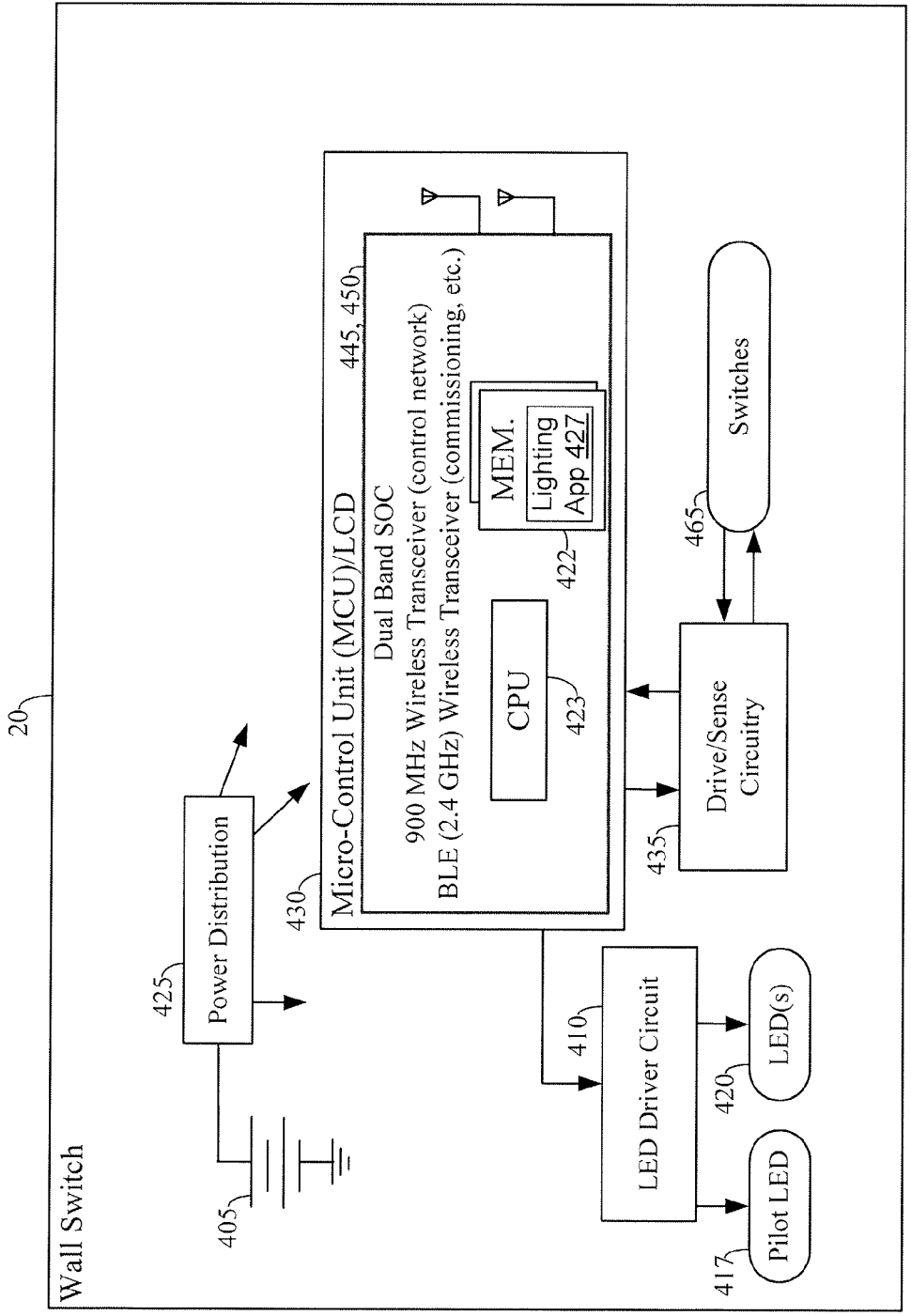

FIGS. 4A-C are block diagrams of a wall switch 20 that communicate via the lighting control system of FIGS. 1B and 1C. The circuitry, hardware, and software of wall switch 20 shown is similar to the luminaire 10 of FIG. 3. However, wall switch 20 is a controller that can be a battery powered device.

Wall switch 20 is similar to luminaire 10 in that they are singularly addressable devices that can be configured to operate as a member of one or more lighting control groups or zones. As shown, wall switch 20 includes a power supply 405, such as a battery or line power, to power itself. Wall switch 10 furthers include an LED driver circuit 410, and a light emitting diode(s) (LED) 420. LED driver circuit 410 is coupled to LED(s) 420 and drives that LED(s) 420 by regulating the power to LED(s) 420 by providing a constant quantity or power to LED light source 420 as its electrical properties change with temperature, for example. The LED driver circuit 410 includes a driver circuit that provides power to LED(s) 420 and a pilot LED 417. LED driver circuit 410 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 410 is manufactured by EldoLED.

LED driver circuit 410 can further include an AC or DC current source or voltage source, a regulator, an amplifier (such as a linear amplifier or switching amplifier), a buck, boost, or buck/boost converter, or any other similar type of circuit or component. LED driver circuit 410 outputs a variable voltage or current to the LED light source 420 that may include a DC offset, such that its average value is nonzero, and/or a AC voltage. The pilot LED 417 indicates the state of the wall switch 20, for example, during the commissioning and maintenance process.

As shown, an MCU 430 is coupled to LED driver circuit 410 and controls the light source operation of the LED(s) 420. MCU 430 includes a memory 422 (volatile and non-volatile) and a central processing unit (CPU) 423. The memory 422 includes a lighting application 427 (which can be firmware) for both lighting control operations and commissioning/maintenance or diagnostic operations. The power distribution circuitry 425 distributes power and ground voltages to the LED driver circuit 410, MCU 430, drive/sense circuitry 435, wireless transceivers 445 and 450, and switches 465 to provide reliable operation of the various circuitry on the wall switch 20.

Wall switch 20 also includes a dual-band wireless radio communication interface system configured for two way wireless communication. In our example, wall switch 12 has a radio set that includes radio 445 for sub-GHz communications an another radio 450 for Bluetooth RF communication. A first transceiver 445, such as a 900 MHz wireless transceiver, issues control operations on the lighting control network. This first transceiver 445 is for any-to-many (unicast and multicast) communication, over a first of the two different wireless communication bands, of control and systems operations information, during luminaire operation and during control network operation over the first wireless communication band.

A second transceiver 450, such as a 2.4 GHz BLE (Bluetooth) wireless transceiver carries out commissioning and maintenance (e.g. diagnostics) of the lighting control network. This second transceiver 450 is for point-to-point communication, over a second of the two different wireless communication bands, of information other than the control and systems operations information, concurrently with at least some communications over the first wireless communication band.

As shown, the MCU 430 includes programming in the memory 422 which configures the CPU (processor) 423 to control operations of the respective wall switch 20, including the communications over the two different wireless communication bands via the dual-band wireless radio communication interface system 445, 450. The programming in the memory 422 includes a real-time operating system (RTOS) and further includes a lighting application 427 which is firmware/software that engages in communications with the commissioning/maintenance application 22 of mobile device 25 over the commissioning network 7 of FIGS. 1B and 1C. The lighting application 427 programming in the memory 422 carries out lighting control operations over the lighting control network 5 of FIGS. 1B and 1C. The RTOS supports multiple concurrent processing threads for different simultaneous control or communication operations of the wall switch 20.

Three different CPU and memory architectures are shown for the MCU 430 of the wall switch 20 in FIGS. 4A-C. In FIG. 4A, in addition to the memory 422 and the CPU 423 of the MCU 430 itself, the first transceiver 445 and the second transceiver 450 each include a separate memory (not shown) and a processor (not shown). Hence, in the example of FIG. 4A, the MCU 430, first transceiver 445, and second transceiver 450 combine to include a total of three processors and three sets of memory.

In FIG. 4B, the MCU 430 itself does not include a separate memory 422 and a CPU 423. Instead, only the first transceiver 445 and the second transceiver 450 each include a separate memory 422 and a processor 423. For efficiency purposes, such as to save manufacturing costs and conserve power (e.g., line power or battery power), the memory 422 and CPU 423 of the first transceiver 445 is selected to perform processing because the majority of processing (normal lighting control operations) occur over the sub-GHz wireless control network 5. Hence, in the example of FIG. 4B, the sensor/control module 415 includes a total of two processors and two sets of memory.

In FIG. 4C, the MCU 430 comprises a dual band system on chip (SOC) 445, 450 and the MCU 430 itself does not include a separate memory 422 and a CPU 423. Instead, the first transceiver 445 and the second transceiver 450 are integrated and combined into the chipset of the MCU 430. Hence, in the example of FIG. 4C, the MCU 430 includes a total of one processor and one set of memory. Integrating the first transceiver 445 and second transceiver 450 into a dual band SOC chipset of the MCU 330, saves manufacturing costs and conserves power (e.g., line power or battery power).

As shown, wall switch 20 includes switches 465, such as a dimmer switch, set scene switch. Switches 465 can be or include sensors, such as infrared sensors for occupancy or motion detection, an in-fixture daylight sensor, an audio sensor, a temperature sensor, or other environmental sensor. Switches 465 may be based on Acuity Brands Lighting's commercially available xPoint® Wireless ES7 product. Drive/sense circuitry 435, such as application firmware, drives the occupancy, audio, and photo sensor hardware.

In our example, wall switch 20 includes a single shared button switch 465 for on/off functions that requires knowledge of state to differentiate between on and off. The wireless control network 5 communicates output device (luminaire 10, plug load controller 30, power pack 35) state to the wall switches 20 as a means of providing the differentiating state. However, the wireless control network 5 suppresses the communication of output devices to constrain network traffic. Therefore control network 5 will rely on the default mechanism (tracked on the device) for determining on/off on all of the types of wall switch. It is therefore possible for the wall switch 20 to occasionally be out of sync with the actual state of the zone particularly at installation commissioning time. Toggling the switch button 465 one or more times will clear any mismatched state. In our example, wireless control network 5 does not communicate load state via the pilot LED 417 of wall switch 20) 20; however, in other examples wireless control network 5 communicates load state via the pilot LED 417 of wall switch 20.

Plug Load Controller

Figure 5A:
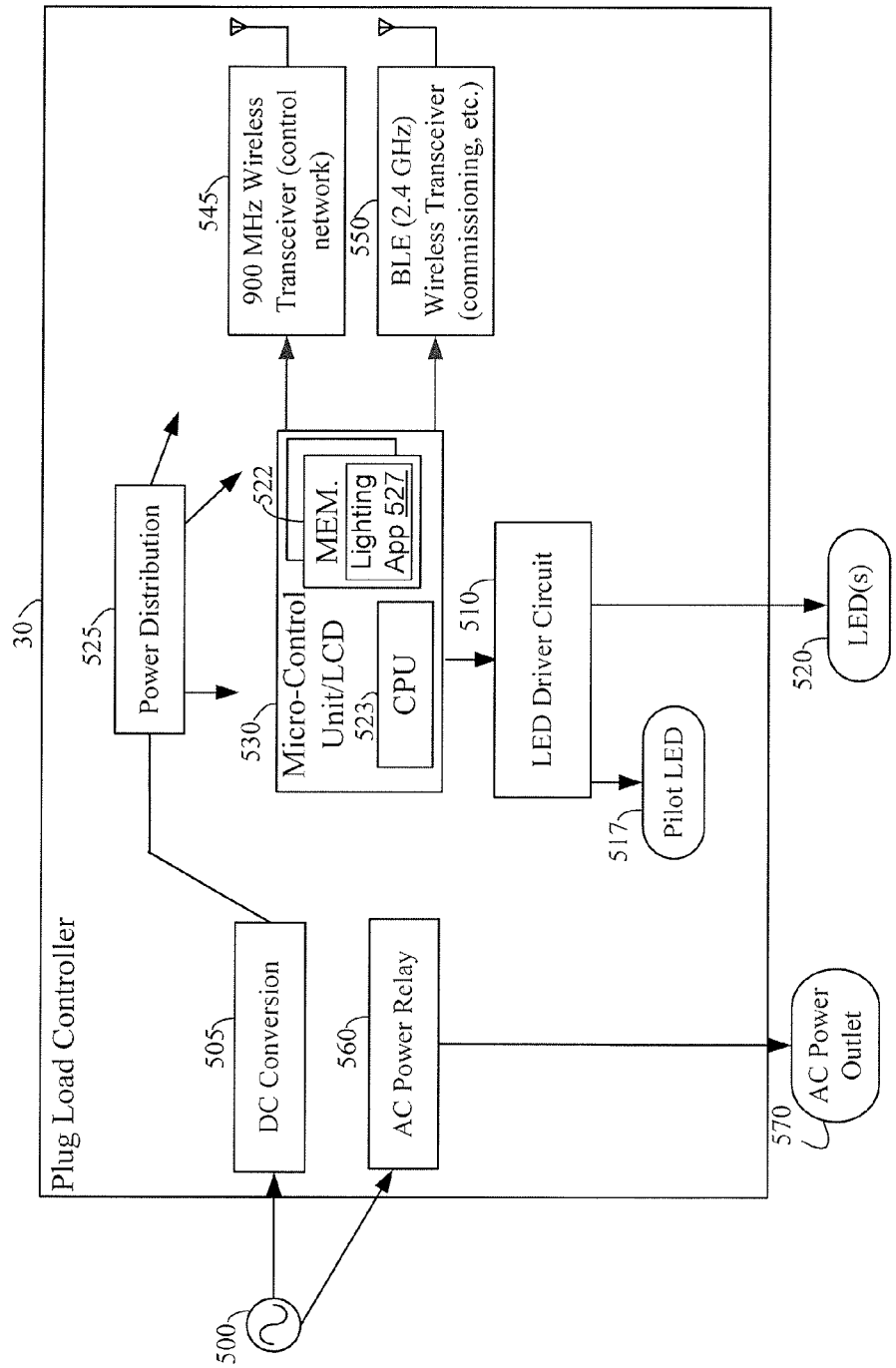
Figure 5B:
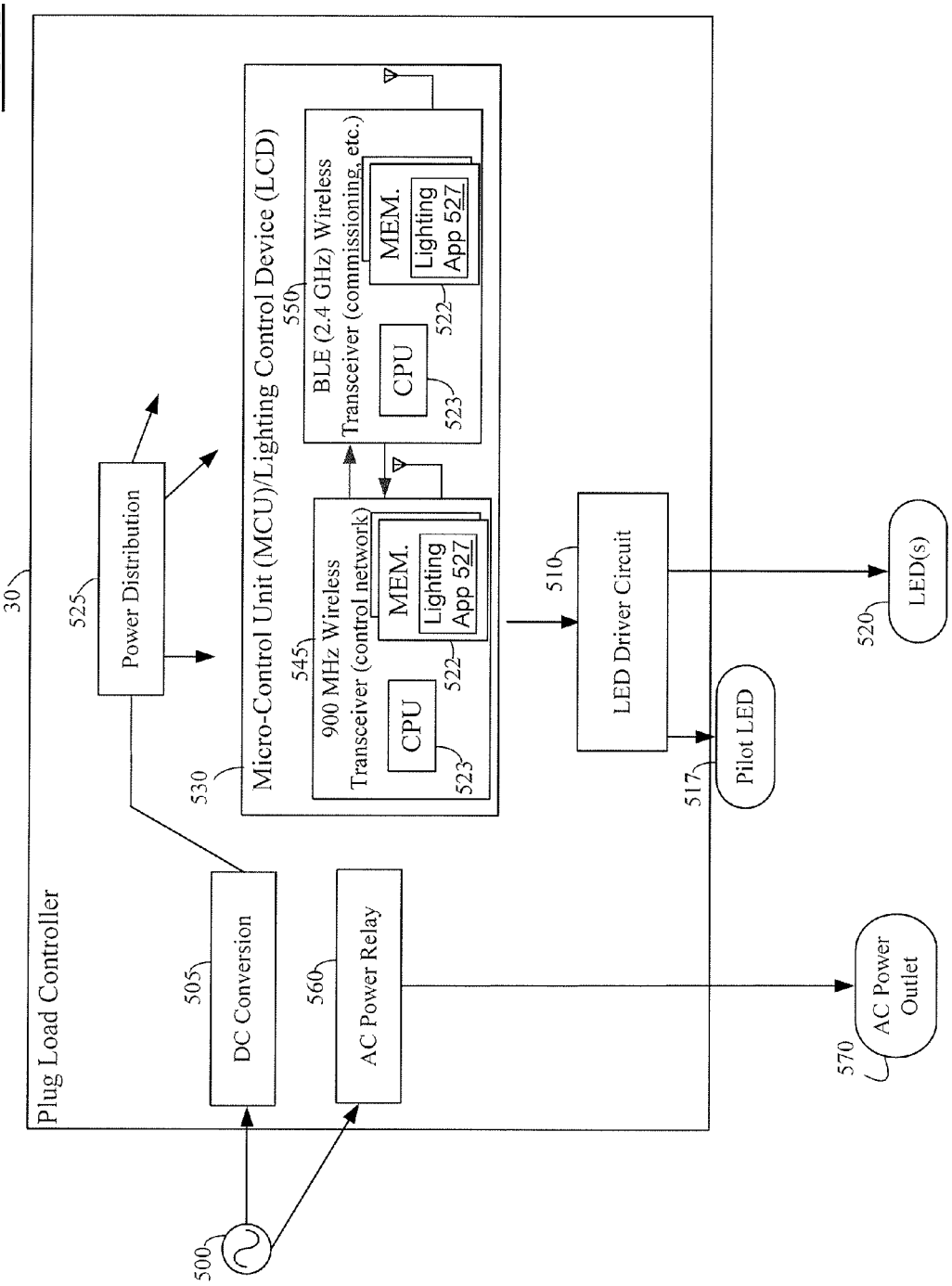

FIGS. 5A-C are block diagrams of a plug load controller 30 that communicates via the lighting control system of FIG. 1C. The circuitry, hardware, and software of plug load controller 30 shown is similar to the luminaire 10 of FIGS. 3A-C. However, plug load controller 30 is a retrofit device that plugs into existing AC wall outlets, for example, and allows existing wired lighting devices, such as table lamps or floor lamps that plug into a wall outlet, to operate in the lighting control system. The plug load controller 30 instantiates the table lamp or floor lamp by allowing for commissioning and maintenance operations and processes wireless lighting controls in order to the allow the lighting device to operate in the lighting control system.

Plug load controller 30 is similar to luminaire 10 in that they are singularly addressable devices that can be configured to operate as a member of one or more lighting control groups or zones. As shown, plug load controller 30 includes a DC conversion circuit 505 (which may instead be a power supply) driven by a power source 500, in our example, an AC line or mains. Power source 500, however, may be a battery, solar panel, or any other AC or DC source.

DC conversion circuit 505 receives power from the power source 500, and may include a magnetic transformer, electronic transformer, switching converter, rectifier, or any other similar type of circuit to convert an input power signal into a suitable power signal to power itself. Plug load controller 500 further comprises an AC power relay 560 (e.g. power switch) which relays incoming AC power from power source 500 to other devices that may plug into the receptacle of plug load controller 30 thus providing an AC power outlet 570.

Plug load controller 30 furthers include an LED driver circuit 510 and a light emitting diode(s) (LED) 520. LED driver circuit 510 is coupled to LED(s) 520 and drives that LED(s) 520 by regulating the power to LED(s) 520 by providing a constant quantity or power to LED(s) 520 as its electrical properties change with temperature, for example. The LED driver circuit 510 includes a driver circuit that provides power to LED(s) 520 and a pilot LED 517. LED driver circuit 510 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 510 is manufactured by EldoLED.

LED driver circuit 510 can further include an AC or DC current source or voltage source, a regulator, an amplifier (such as a linear amplifier or switching amplifier), a buck, boost, or buck/boost converter, or any other similar type of circuit or component. LED driver circuit 510 outputs a variable voltage or current to the LED(s) 520 that may include a DC offset, such that its average value is nonzero, and/or a AC voltage. The pilot LED 417 indicates the state of the plug load controller 30, for example, during the commissioning, diagnostics and maintenance process.

For purposes of communication and control, plug load controller 30 is treated as single addressable device that can be configured to operate as a member of one or more lighting control groups or zones. The plug load controller 30 is line powered and remains operational as long as power is available.

Plug load controller 30 includes power distribution circuitry 525 and a micro-control unit (MCU) 530. As shown, MCU 530 is coupled to LED driver circuit 510 and controls the light source operation of the LED(s) 520. MCU 530 includes a memory 522 (volatile and non-volatile) and a central processing unit (CPU) 523. The memory 522 includes a lighting application 527 (which can be firmware) for both lighting control operations and commissioning/maintenance operations. The power distribution circuitry 525 distributes power and ground voltages to the LED driver circuit 510, MCU 530, and wireless transceivers 545 and 550 to provide reliable operation of the various circuitry on the plug load controller 30 chip.

Plug load controller 30 also includes a dual-band wireless radio communication interface system configured for two way wireless communication. In our example, plug load controller 30 has a radio set that includes radio 545 for sub-GHz communications and another radio 550 for Bluetooth RF communications. A first transceiver 545, such as a 900 MHz wireless transceiver, issues control operations on the lighting control network. This first transceiver 545 is for any-to-many (unicast and multicast) communication, over a first of the two different wireless communication bands, of control and systems operations information, during luminaire operation and during control network operation over the first wireless communication band.

A second transceiver 550, such as a 2.4 GHz BLE (Bluetooth) wireless transceiver carries out commissioning and maintenance and diagnostics of the lighting control network. This second transceiver 550 is for point-to-point communication, over a second of the two different wireless communication bands, of information other than the control and systems operations information, concurrently with at least some communications over the first wireless communication band.

As shown, the MCU 530 includes programming in the memory 522 which configures the CPU (processor) 523 to control operations of the respective plug load controller 30, including the communications over the two different wireless communication bands via the dual-band wireless radio communication interface system 545, 550. The programming in the memory 522 includes a real-time operating system (RTOS) and further includes a lighting application 527 which is firmware/software that engages in communications with the application 22 of mobile device 25 over the commissioning network 7 of FIGS. 1B and 1C. The lighting application 527 programming in the memory 522 carries out lighting control operations over the lighting control network 5 of FIGS. 1B and 1C. The RTOS supports multiple concurrent processing threads for different simultaneous control or communication operations of the plug load controller 30.

As shown in FIGS. 5B and 5C, MCU 530 of plug load controller 30 may be of the three different CPU and memory architectures similar to those depicted and described for the luminaire 10 in FIGS. 3A-C and the wall switch 20 in FIGS. 4A-C. As explained earlier, integrating the first transceiver 545 and second transceiver 550, for example, into a dual band SOC chipset of the MCU 530, saves manufacturing costs and conserves power (e.g., line power or battery power).

Plug load controller 30 may include detector(s), such as a daylight sensor, an occupancy sensor, an audio sensor, a temperature sensor, or other environmental sensor (not shown). Detector(s) may be based on Acuity Brands Lighting's commercially available xPoint® Wireless ES7 product. Drive/sense circuitry (not shown), such as application firmware, can drive the occupancy and photo sensor hardware.

Power Pack

Figure 6A:
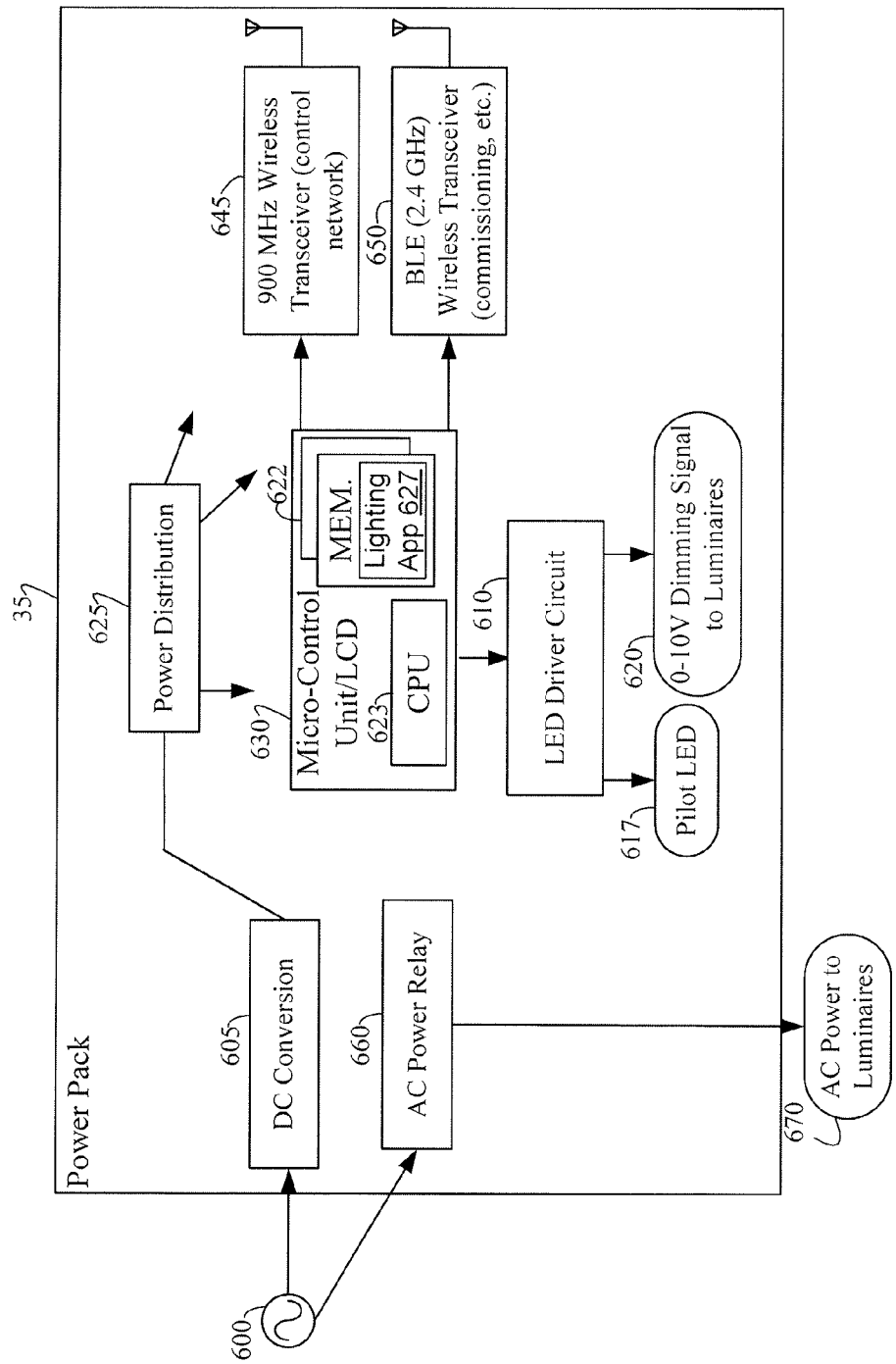
FIGS. 6A-C are block diagrams of power packs that communicate via the lighting control system of FIG. 1B or FIG. 1C.
Figure 6B:
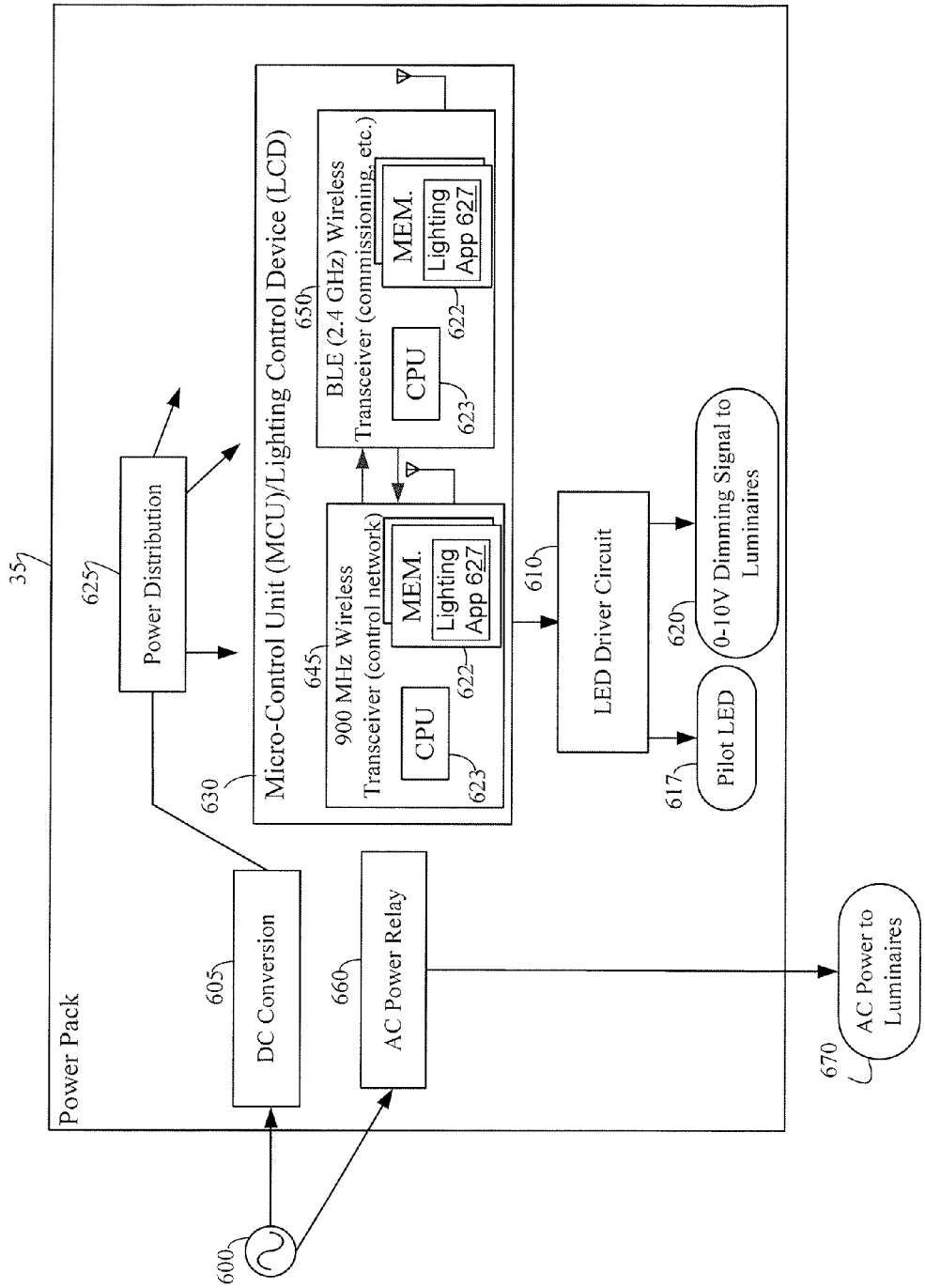
Figure 6C:
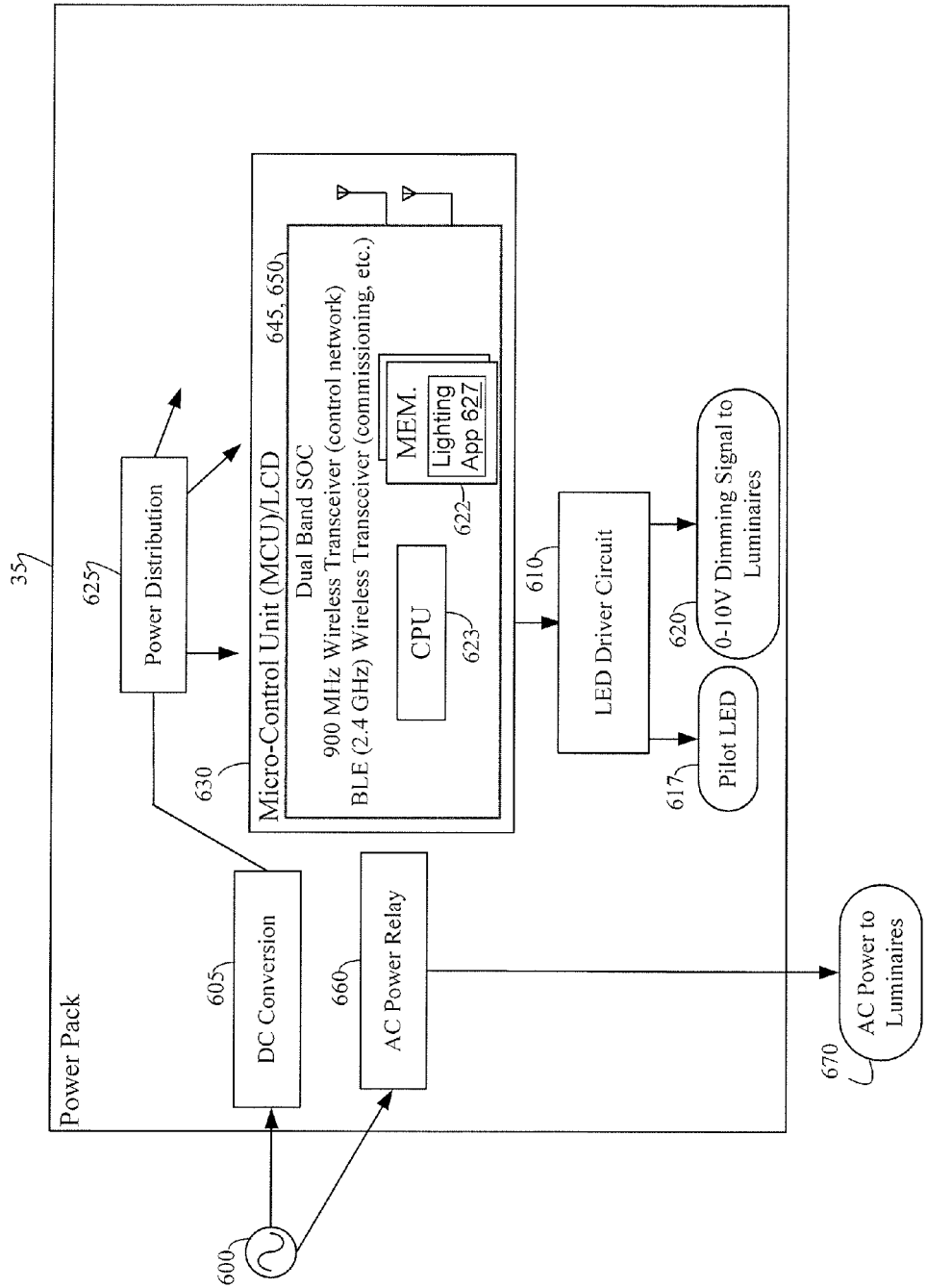

FIGS. 6A-C are block diagrams of a power pack 35 that communicates via the lighting control system of FIG. 1C. The circuitry, hardware, and software of power pack 35 shown is similar to the luminaire 10 of FIGS. 3A-C. However, power pack 35 is a device that retrofits with existing wired light fixtures (luminaires). The power pack 35 instantiates the wired light fixture by allowing for commissioning and maintenance operations and processes wireless lighting controls in order to allow the lighting device to operate in the lighting control system.

Power pack 35 is similar to luminaire 10 in that they are singularly addressable devices that can be configured to operate as a member of one or more lighting control groups or zones. As shown, power pack 35 includes a DC conversion circuit 605 (which may instead be a power supply) driven by a power source 600, in our example, an AC line or mains. Power source 600, however, may be a battery, solar panel, or any other AC or DC source.

DC conversion circuit 605 receives power from the power source 600, and may include a magnetic transformer, electronic transformer, switching converter, rectifier, or any other similar type of circuit to convert an input power signal into a suitable power signal to power itself. Power pack 35 further comprises an AC power relay 660 (e.g. power switch) which relays incoming AC power from power source 600 to the existing wired luminaire.

Power pack 35 furthers include an LED driver circuit 610. LED driver circuit 610 is coupled to luminaire and drives that luminaire by regulating a driving signal, in our example, a 0-10V dimming signal 620. The LED driver circuit 610 includes a driver circuit that provides power to a pilot LED 617 and a dimming signal to luminaire 620. LED driver circuit 610 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 610 is manufactured by EldoLED.

LED driver circuit 610 can further include an AC or DC current source or voltage source, a regulator, an amplifier (such as a linear amplifier or switching amplifier), a buck, boost, or buck/boost converter, or any other similar type of circuit or component. LED driver circuit 610 outputs a variable voltage or current as the dimming signal to luminaire(s) 620 that may include a DC offset, such that its average value is nonzero, and/or a AC voltage. The pilot LED 617 indicates the state of the power pack 35, for example, during the commissioning, diagnostics and maintenance process.

For purposes of communication and control, power pack 35 is treated as single addressable device that can be configured to operate as a member of one or more lighting control groups or zones. The power pack 35 is line powered and remains operational as long as power is available.

Power pack 35 includes power distribution circuitry 625 and a micro-control unit (MCU) 630. As shown, MCU 630 is coupled to LED driver circuit 610 and controls the light source operation of the luminaire via the dimming signal to luminaire 620. MCU 630 includes a memory 622 (volatile and non-volatile) and a central processing unit (CPU) 623. The memory 622 includes a lighting application 627 (which can be firmware) for both lighting control operations and commissioning/maintenance operations. The power distribution circuitry 625 distributes power and ground voltages to the LED driver circuit 610, MCU 630, and wireless transceivers 645 and 650 to provide reliable operation of the various circuitry on the power pack 35 chip.

Power pack 35 also includes a dual-band wireless radio communication interface system configured for two way wireless communication. In our example, power pack 35 has a radio set that includes radio 645 for sub-GHz communications and another radio 650 for Bluetooth RF communications. A first transceiver 645, such as a 900 MHz wireless transceiver, issues control operations on the lighting control network. This first transceiver 645 is for any-to-many (unicast and multicast) communication, over a first of the two different wireless communication bands, of control and systems operations information, during luminaire operation and during control network operation over the first wireless communication band.

A second transceiver 650, such as a 2.4 GHz BLE (Bluetooth) wireless transceiver carries out commissioning and maintenance and diagnostics of the lighting control network. This second transceiver 650 is for point-to-point communication, over a second of the two different wireless communication bands, of information other than the control and systems operations information, concurrently with at least some communications over the first wireless communication band.

As shown, the MCU 630 includes programming in the memory 622 which configures the CPU (processor) 623 to control operations of the respective power pack 35, including the communications over the two different wireless communication bands via the dual-band wireless radio communication interface system 645, 650. The programming in the memory 622 includes a real-time operating system (RTOS) and further includes a lighting application 627 which is firmware/software that engages in communications with the commissioning/maintenance application 22 of mobile device 25 over the commissioning network 7 of FIGS. 1B and 1C. The lighting application 627 programming in the memory 622 carries out lighting control operations over the lighting control network 5 of FIGS. 1B and 1C. The RTOS supports multiple concurrent processing threads for different simultaneous control or communication operations of the power pack 35.

As shown in FIGS. 6B and 6C MCU 630 of power pack 35 may be of the three different CPU and memory architectures similar to those depicted and described for the luminaire 10 in FIGS. 3A-C and the wall switch 20 in FIGS. 4A-C. As explained earlier, integrating the first transceiver 645 and second transceiver 650, for example, into a dual band SOC chipset of the MCU 630, saves manufacturing costs and conserves power (e.g., line power or battery power).

Power pack 35 may include detector(s), such as a daylight sensor, an occupancy sensor, an audio sensor, a temperature sensor, or other environmental sensor (not shown). Detector(s) may be based on Acuity Brands Lighting's commercially available xPoint® Wireless ES7 product. Drive/sense circuitry (not shown), such as application firmware, can drive the occupancy and photo sensor hardware.

Sensor

Figure 7A:
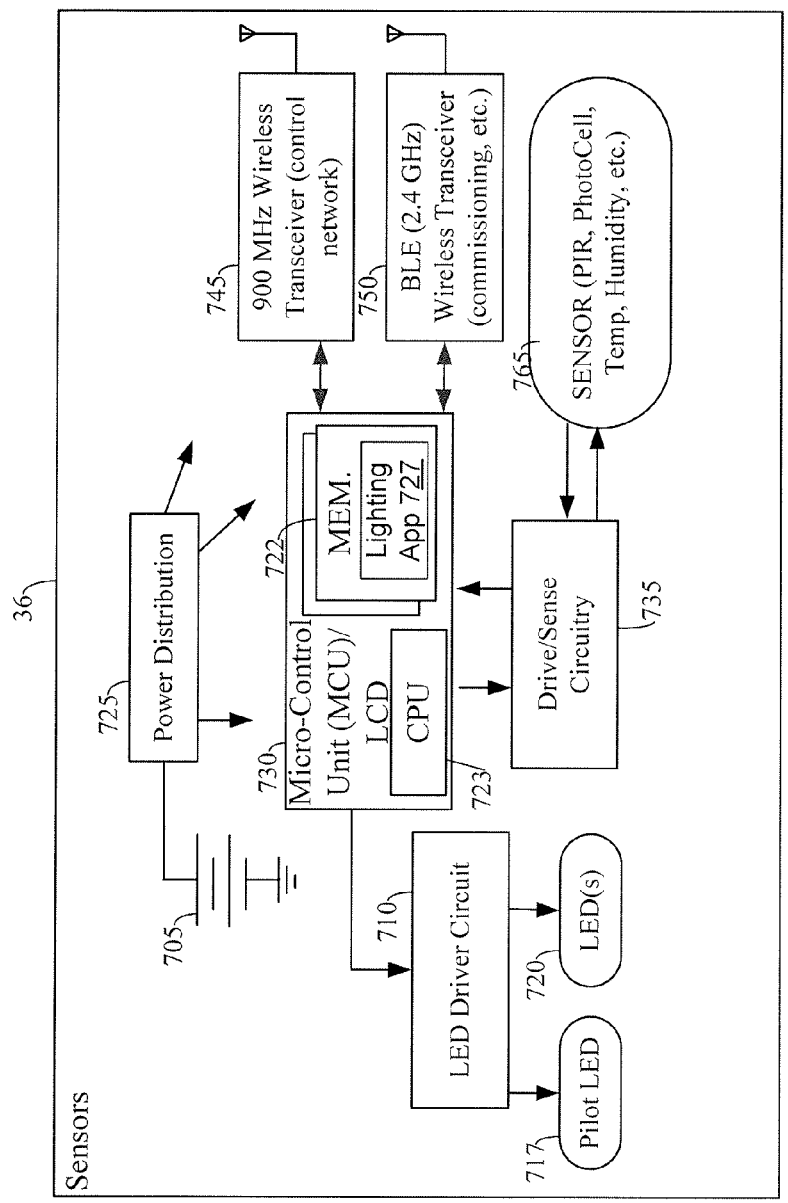
FIGS. 7A-C are block diagrams of sensors that communicate via the lighting control system of FIG. 1B or FIG. 1C.
Figure 7B:
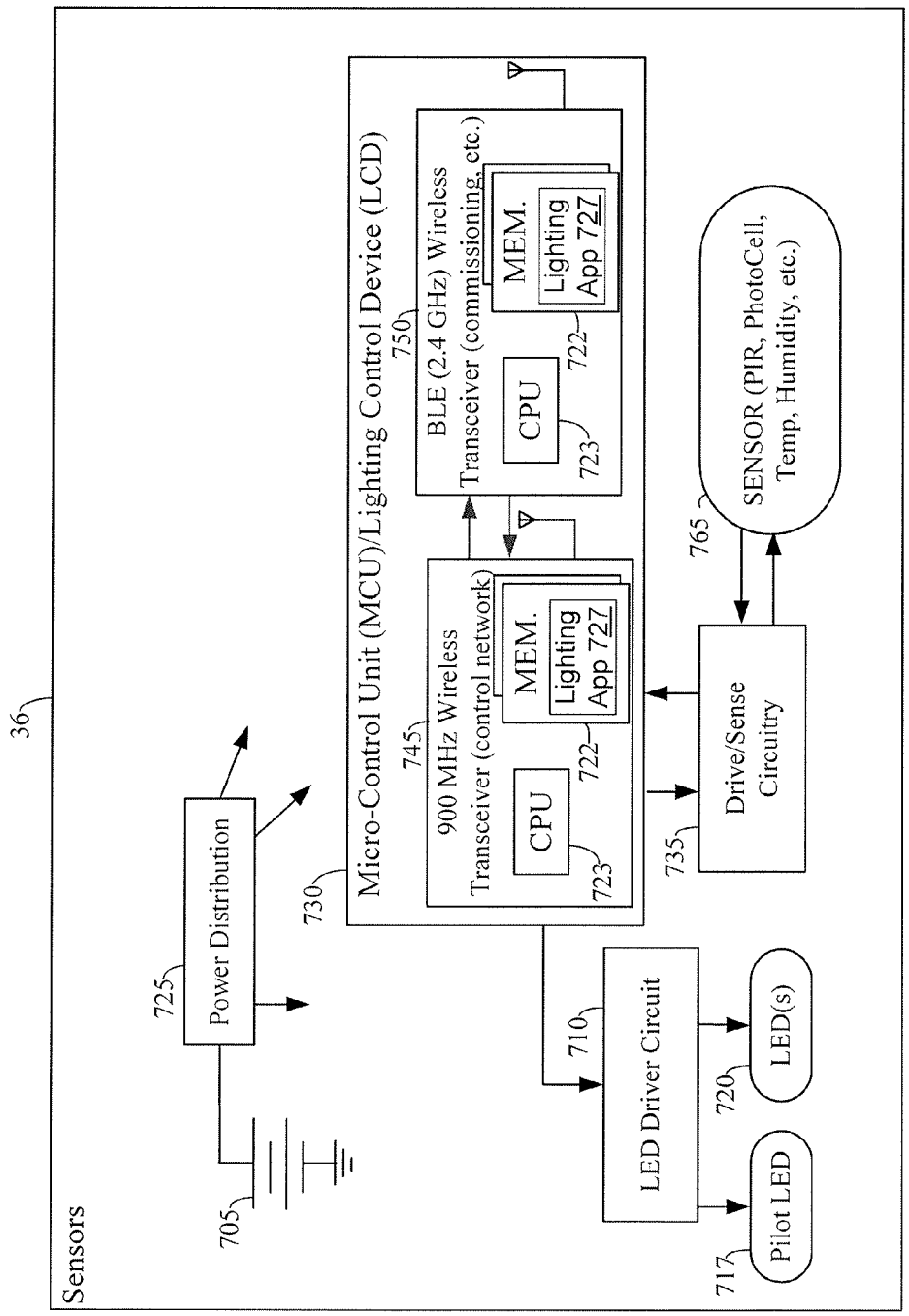
Figure 7C:
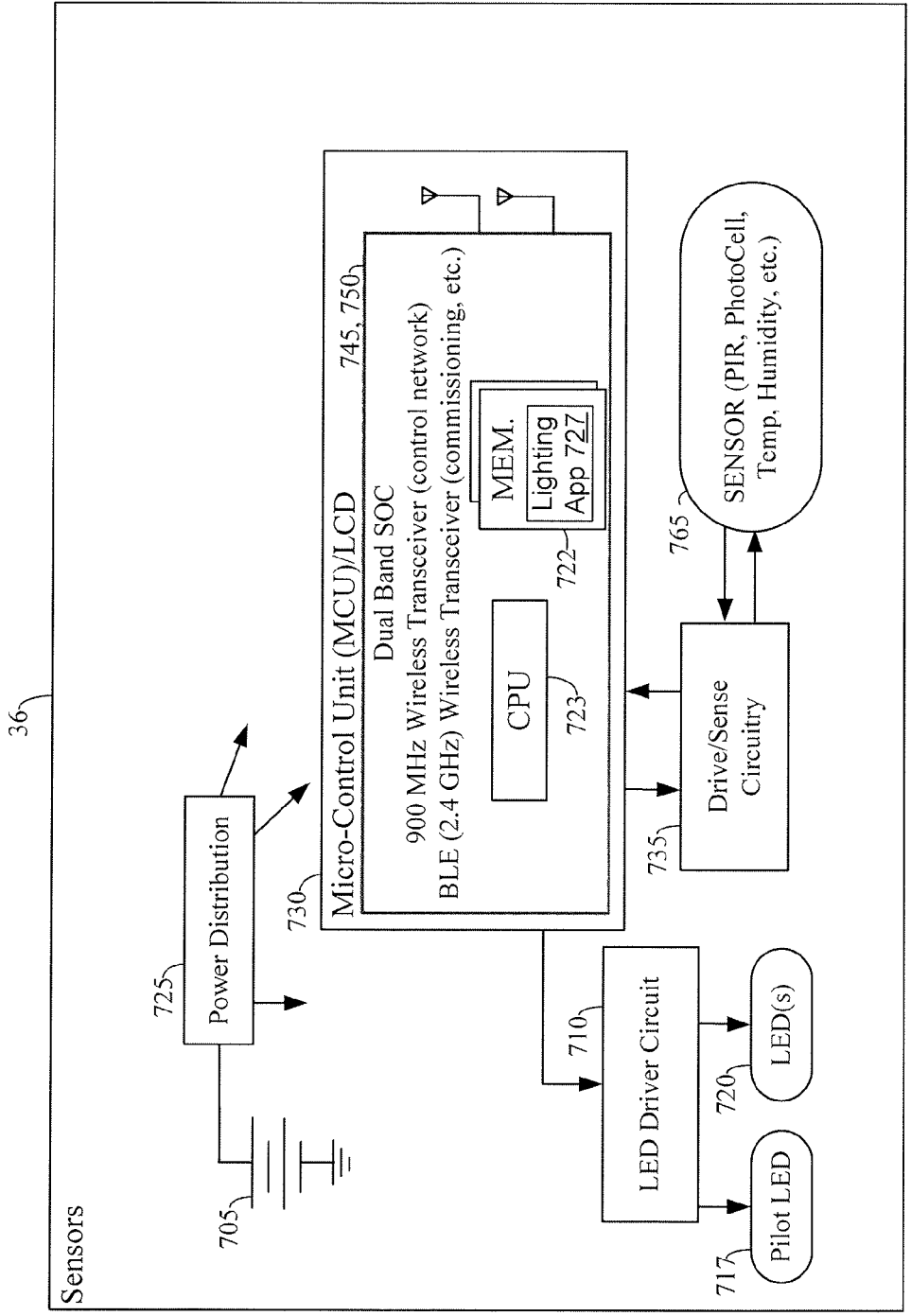

FIGS. 7A-C are block diagrams of a sensor 36 that communicate via the lighting control system of FIGS. 1B and 1C. The circuitry, hardware, and software of sensor 36 shown is similar to the luminaire 10 of FIG. 3A-C. However, sensor 36 is a controller that can be a battery powered device.

Sensor 36 is similar to luminaire 10 in that they are singularly addressable devices that can be configured to operate as a member of one or more lighting control groups or zones. As shown, sensor 36 includes a power supply 705, such as a battery or line power, to power itself. Sensor 36 furthers include an LED driver circuit 710, and a light emitting diode(s) (LED) 720. LED driver circuit 710 is coupled to LED(s) 720 and drives that LED(s) 720 by regulating the power to LED(s) 720 by providing a constant quantity or power to LED light source 720 as its electrical properties change with temperature, for example. The LED driver circuit 710 includes a driver circuit that provides power to LED(s) 720 and a pilot LED 717. LED driver circuit 710 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 710 is manufactured by EldoLED.

LED driver circuit 710 can further include an AC or DC current source or voltage source, a regulator, an amplifier (such as a linear amplifier or switching amplifier), a buck, boost, or buck/boost converter, or any other similar type of circuit or component. LED driver circuit 710 outputs a variable voltage or current to the LED light source 720 that may include a DC offset, such that its average value is nonzero, and/or a AC voltage. The pilot LED 717 indicates the state of the sensor 36, for example, during the commissioning, diagnostics and maintenance process.

As shown, an MCU 730 is coupled to LED driver circuit 710 and controls the light source operation of the LED(s) 720. MCU 730 includes a memory 722 (volatile and non-volatile) and a central processing unit (CPU) 723. The memory 722 includes a lighting application 727 (which can be firmware) for both lighting control operations and commissioning/maintenance or diagnostic operations. The power distribution circuitry 725 distributes power and ground voltages to the LED driver circuit 710, MCU 730, drive/sense circuitry 735, wireless transceivers 745 and 750, and sensor 765 (e.g. PR, PhotoCell, Temperature, Humidity, etc.) to provide the sensing function of sensor 36.

Sensor 36 also includes a dual-band wireless radio communication interface system configured for two way wireless communication. In our example, wall switch 12 has a radio set that includes radio 745 for sub-GHz communications an another radio 750 for Bluetooth RF communication. A first transceiver 745, such as a 900 MHz wireless transceiver, issues control operations on the lighting control network. This first transceiver 745 is for any-to-many (unicast and multicast) communication, over a first of the two different wireless communication bands, of control and systems operations information, during luminaire operation and during control network operation over the first wireless communication band.

A second transceiver 750, such as a 2.4 GHz BLE (Bluetooth) wireless transceiver carries out commissioning and maintenance (e.g. diagnostics) of the lighting control network. This second transceiver 750 is for point-to-point communication, over a second of the two different wireless communication bands, of information other than the control and systems operations information, concurrently with at least some communications over the first wireless communication band.

As shown, the MCU 730 includes programming in the memory 722 which configures the CPU (processor) 723 to control operations of the respective sensor 36, including the communications over the two different wireless communication bands via the dual-band wireless radio communication interface system 745, 750. The programming in the memory 722 includes a real-time operating system (RTOS) and further includes a lighting application 727 which is firmware/software that engages in communications with the commissioning/maintenance (e.g. diagnostics) application 22 of mobile device 25 over the commissioning network 7 of FIGS. 1B and 1C. The lighting application 727 programming in the memory 722 carries out lighting control operations over the lighting control network 5 of FIGS. 1B and 1C. The RTOS supports multiple concurrent processing threads for different simultaneous control or communication operations of the sensor 36.

Three different CPU and memory architectures are shown for the MCU 730 of the wall switch 20 in FIGS. 7A-C. In FIG. 7A, in addition to the memory 722 and the CPU 423 of the MCU 430 itself, the first transceiver 745 and the second transceiver 750 each include a separate memory (not shown) and a processor (not shown). Hence, in the example of FIG. 7A, the MCU 730, first transceiver 745, and second transceiver 750 combine to include a total of three processors and three sets of memory.

In FIG. 7B, the MCU 730 itself does not include a separate memory 722 and a CPU 723. Instead, only the first transceiver 745 and the second transceiver 750 each include a separate memory 722 and a processor 723. For efficiency purposes, such as to save manufacturing costs and conserve power (e.g., line power or battery power), the memory 722 and CPU 723 of the first transceiver 745 is selected to perform processing because the majority of processing (normal lighting control operations) occur over the sub-GHz wireless control network 5. Hence, in the example of FIG. 7B, the sensor/control module 715 includes a total of two processors and two sets of memory.

In FIG. 7C, the MCU 730 comprises a dual band system on chip (SOC) 745, 750 and the MCU 730 itself does not include a separate memory 722 and a CPU 723. Instead, the first transceiver 745 and the second transceiver 750 are integrated and combined into the chipset of the MCU 730. Hence, in the example of FIG. 7C, the MCU 730 includes a total of one processor and one set of memory. Integrating the first transceiver 745 and second transceiver 750 into a dual band SOC chipset of the MCU 330, saves manufacturing costs and conserves power (e.g., line power or battery power).

As shown, wall switch 20 includes sensor 765, such as photocell, infrared sensor for occupancy or motion detection, an in-fixture daylight sensor, an audio sensor, a temperature sensor, or other environmental sensor. Drive/sense circuitry 735, such as application firmware, drives the occupancy, audio, and photo sensor hardware.

Interface

Figure 8A:
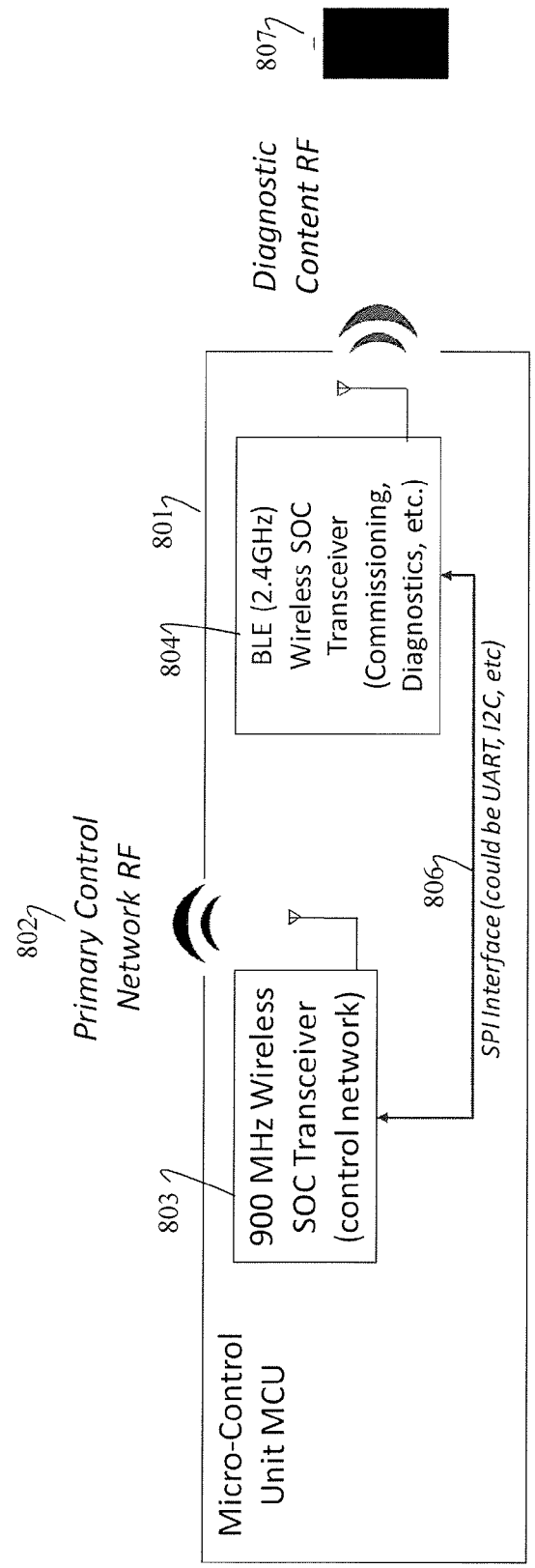
FIG. 8A is a high-level functional block diagram of communication between a micro-control unit of a lighting device and a mobile device of the lighting control system of FIG. 1B or 1C.

FIG. 8A shows an example of an interface 806 of MCU 801 which is similar to the configuration of the MCU shown in FIG. 3B. Interface 806 connects primary transceiver 803 and secondary Bluetooth transceiver 804. This interface connection (e.g. interface bus) may be for example, a serial peripheral interface bus (SPI), a universal asynchronous receiver/transmitter (UART), an inter-IC bus (I2C), or some other equivalent.

Generally, the interface is utilized by the CPUs of transceivers 803 and 804 to communicate diagnostic commands and diagnostic information back and forth. For example, a diagnostic command transmitted from a mobile device 807 may be received at Bluetooth transceiver 804. The CPU of Bluetooth transceiver 804 may process this command and send a request for diagnostic information over SPI interface 806. The CPU of SOC transceiver 803 may then retrieve the diagnostic information which is based on data received/transmitted through primary control network 802.

It should be noted that SPI interface 806 is used for communicating many types of commands and data between the transceivers. For example, interface 806 may be used to communicate diagnostic commands/data, maintenance commands/data and commissioning commands/data between the transceivers. In order to identify and process these different types of communications, transmissions are packetized.

It is also noted that SPI interface 806 may be used in any of the hardware configurations shown in the various figures. For example, interface 806 may be used in the hardware configurations shown in FIGS. 3A-C, FIGS. 4A-C, FIGS. 5A-C, FIGS. 6A-C, and FIGS. 7A-C.

Figure 8B:
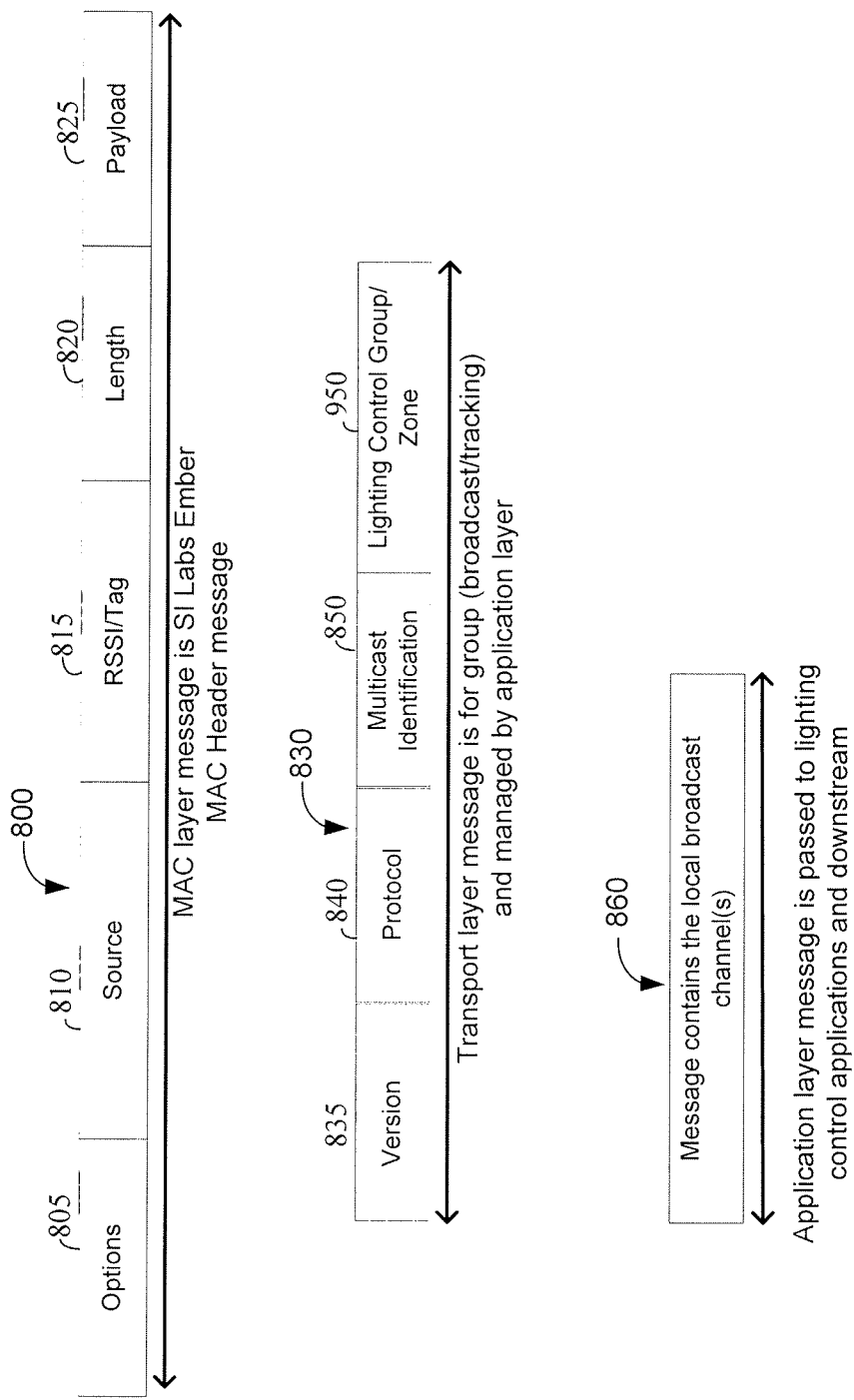
FIG. 8B shows a media access control (MAC) layer message, a transport layer message, and an application layer message.

Various packet formats for use on interface 806 are shown in FIG. 8B. In FIG. 8B, a media access control (MAC) layer message for communicating a state change event to a lighting control device on a lighting control network is shown. As shown, a MAC layer message 800 includes the following fields: option(s) 805, a source identifier 810, an RSSI/tag 815, a length of message 820, and a protocol data unit (PDU) or payload. In an example, the protocol for communicating the state change event is the AT command-response protocol defined in the SiLabs SPP-Over-BLE Application Note, 15, Nov. 2013, version 1.0, section 7.

Options 805 may include a namespace field that has a command identifier. The command identifier may act as a header for identify and distinguishing commissioning commands, diagnostic commands, maintenance, etc., communicated over the SPI interface shown in FIG. 8A. For example, if a packet is received by Bluetooth transceiver 806, its header is initially processed. The header may indicate that the message is a diagnostic command. This can then be forwarded over the interface 806 to primary transceiver 803 to retrieve the identified diagnostic information. Other types of messages (e.g. commissioning) may be processed in a similar manner.

Source 810 as shown in FIG. 8B identifies the lighting control device that has detected the state change event, for example, the source is the short sub-GHz MAC address of the detecting lighting control device. Length 820 specifies the length of the message, for example, number of bytes of the whole message (header plus payload plus checksum). Payload 825 is device specific and the form of the payload 825 is interpreted and managed by the lighting application 327. The MAC layer message 800 may further include a destination address (not shown) which is the sub-GHz short MAC address of the destination lighting control device (e.g., group/zone monitor).

FIG. 8B also shows a transport layer message for communicating a state change event to a lighting control device on a lighting control network. As shown, the transport layer message 830 includes the following fields: version 835, protocol 840, multicast identification 845, and lighting control group/zone identification 850. Version 835 specifies the firmware protocol version of the lighting application 327, for example. Protocol 840 specifies the lighting control network command communication protocol. Multicast identification 845 specifies the broadcast channel or an address of the lighting control group/zone. Lighting control group/zone 850 identifies the lighting control group or zone of the lighting control device that detected the state change event.

FIG. 8B furthermore shows an application layer message for communicating a state change event to a lighting control device on a lighting control network. As shown, the application layer message 860 includes the broadcast channel or address of all of the lighting control group(s)/zone(s) that should receive the message. A lighting control group/zone monitor peaks into the application layer message 860 body and extracts the payload to pass the message to local and downstream lighting control devices.

Diagnostics

As described in FIGS. 1B and 1C, the diagnostic monitoring device for transmitting the diagnostic commands to the luminaires and lighting control devices may be any type of computing device (e.g. Smartphone, Laptop, Tablet) that includes a Bluetooth transceiver. FIGS. 9A-D show examples of screenshots where the diagnostic monitoring device is implemented as a Smartphone 810.

FIG. 9A, shows a screenshot of a login screen when then the diagnostic application is first initiated. This login screen 900 may request user credentials to access the features of the diagnostic application. For example, the login screen 900 may request a username and a password previously assigned to an registered user. In other examples, other credentials (e.g. fingerprints, facial recognition, etc.) may be used to identify the user.

In order to validate the user, the credential information may be sent to a backend server (e.g. server 65 or the like) that performs an authentication. If the credential information is not verified, a screen (not shown) may be displayed, explaining to the user why the login failed. If, however, the credential information is verified, then the diagnostic application may be launched.

Figure 9B:
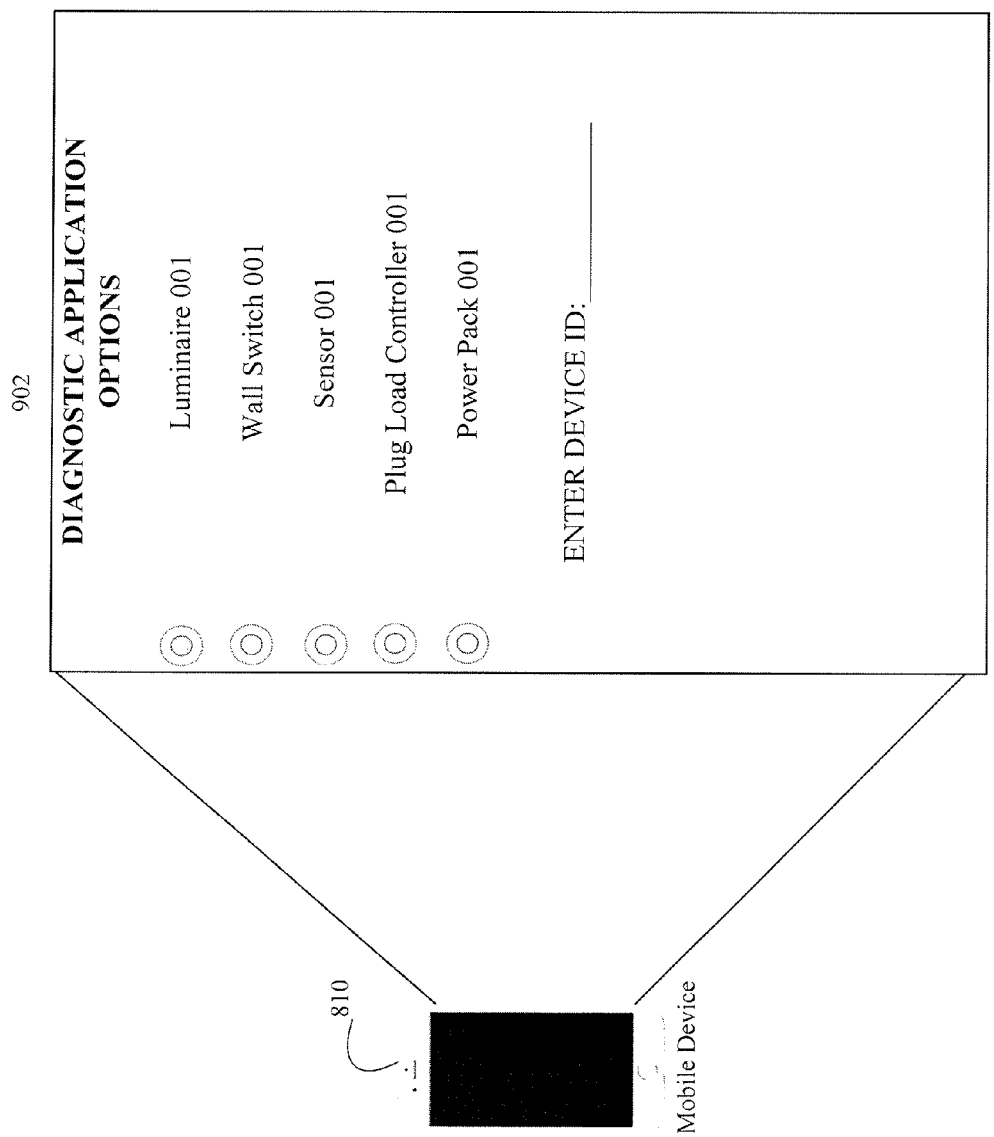

Once the diagnostic application is launched, the user may have the option of selecting different devices (e.g. luminaires, and lighting control devices) that may be probed for diagnostic information. For example, FIG. 9B shows a screenshot 902 of a list of network identified devices (e.g. luminaires, wall switches, etc.) that may be selected for diagnostic monitoring. This list may be automatically populated by retrieving devices known to the Smartphone to be on the lighting network. In addition, the Smartphone can scan the local network to identify lighting devices. Once the list is populated, the user can then select one or more of these devices (e.g. Luminaire 001) for monitoring. In another example, the user can simply enter a known device ID into the prompt.

Figure 9C:
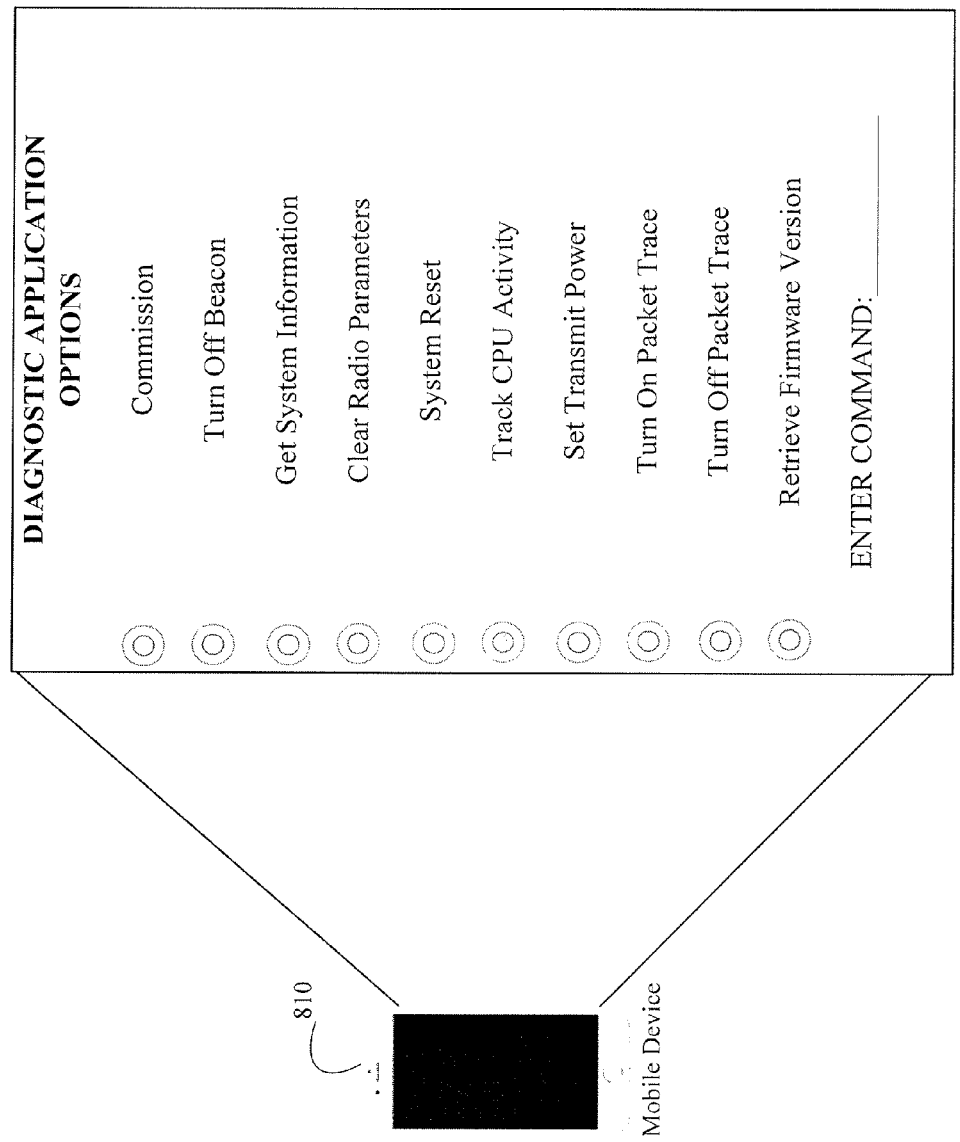

Once the user selects a specific device for diagnostic monitoring, the user may have the option of selecting different diagnostic commands (e.g. commissioning, beacon control, CPU activity, etc.) that may be used to retrieve specific diagnostic information. For example, FIG. 9C shows a screenshot 904 of a list of possible commands that may be selected for requesting specific diagnostic information from the luminaires and lighting control devices. This list may be automatically populated by retrieving commands known to the Smartphone to be usable on the lighting network. In addition, the Smartphone can scan the local network to search for updated commands. Once the list is populated, the user can then select one or more of these commands (e.g. Track CPU Activity) for performing monitoring on the identified device. In another example, the user can simply enter a known command into the prompt.

Once the user selects a command for diagnostic monitoring, the command is transmitted, via Bluetooth transceiver, to the identified device for diagnostic monitoring. For example, Smartphone 807 may transmit, via Bluetooth, the "track CPU activity" command to "Luminaire 001". This command is received by the Bluetooth transceiver 804 of Luminaire 001, communicated over interface 806 and used by transceiver 803 to track CPU activity for a given time that may be specified in the command itself. Once Luminaire 001 is finished tracking the CPU activity, this diagnostic data is then packetized and transmitted back to Smartphone 810, via Bluetooth transceiver 804 for display as shown in FIG. 9D. The user (e.g. technician) uses this displayed data to analyze performance, and identify possible errors in performance, of Luminaire 001. In another example, once the packetized data is received by Smartphone 810 the data for Luminaire 001 is automatically stored in a file (e.g. a text file) rather than being displayed directly on the Smartphone screen. Each device (e.g. Luminaires, Wall Plugs, etc.) in the lighting network may have their own dedicated file on the Smartphone, or they may share a common file on the Smartphone which is populated with the diagnostic data. In either case, the user then opens the file when they want to view the data for Luminaire 001. The data is then displayed on the screen of the Smartphone. In yet another example, the data of Luminaire 001 may route the data directly to a file (e.g. text file) before packetized transmission to the Smartphone. This allows the Smartphone to receive the diagnostic data in a certain file format which can be stored for later use.

The following is an exemplary, but not exhaustive list of possible commands to use for monitoring the diagnostics of luminaires and lighting control devices:

Commission: set the sub-gigahertz radio parameters
Bleoff: turn off the BLE beacons
Info: get system level information
Leave: clear the sub-gigahertz radio parameters
Reset: system reset
Cpu: track cpu activity
nvm_init: initialize non-volatile memory
tx_tone: Enable a tone from the radio
tx_stream: Enable a PN9 stream from the radio
setPower: Set the current transmit power in deci dBm
pgt: print the group table
send_nL_msg: send a test message
rssi: get the sub-gigahertz RSSI
txpwr: Set the transmit power
txpwr_check: get the transmit power from another node
aset: Perform an AutoSetpoint
dim: change the dim level
debug: general purpose debug command
ccat: run the CCA Test
BLEPWR: set the BLE power
DISC: BLE Disconnect
Diss: reset group and radio parameters
Pti: Turn on the packet trace interface
Rcli: start a remote CLI session with another node
Rdis: end the remote CLI session
Fwver: get the firmware version of each node
Pel: print_error_log
Eel: erase_error_log
Sniff: retrieve the RF or IF signals received, e.g. at the 900 MHz transceiver The overall process for monitoring devices as shown in FIGS. 9A-C, is further explained in the flowchart of FIG. 10. In step 1002, monitoring device (e.g. Smartphone) displays the login screen. Once the user enters their credentials, then in step 1004, the monitoring device performs user authentication. In step 1006, if it is determined that the authentication has failed, then the session ends in step 1008. If, however, in step 1006, it is determined that the authentication is successful, the diagnostic application is launched in step 1010. A list of available devices for monitoring is then displayed in step 1012. Once one or more of the listed devices are determined to be selected in step 1014, the monitoring device displays, in step 1016, available diagnostic commands. Once one or more of the listed diagnostic commands are determined to be selected in step 1018, the monitoring device, in step 1020 transmits the command to the identified device where the command is executed (e.g. the requested data is monitored). Once the command is finished executing, the diagnostic data is then transmitted back to the monitoring device and displayed to the user in step 1022.

Frequently there are RF issues which can be solved by performing some form of sniffing of the RF spectrum. Conventionally, this is problematic in that this usually requires a technical expert to travel to a problem site with expensive diagnostic equipment and be there at a time the symptoms are being experienced. Additionally, sniffing near a problem device does not necessarily reveal exactly what that device (e.g. a Luminaire) sees within it is own radio (e.g. the 900 MHz transceiver). The luminaires and system examples discussed herein may address this issue via an operation in which trace logs or the like representing the RF spectrum detected by the main transceiver may be streamed from the main radio for communication via the separate commissioning radio.

For example, as discussed above, the luminaires and lighting control devices have two radios. One radio (e.g. Bluetooth transceiver) is principally utilized for commissioning and diagnostics, while the other radio (e.g. 900 MHz transceiver) is principally used for mainstream inter-device communications for control of the system. Imagine a scenario where a device (e.g. Luminaire) in a particular location is having a sporadic issue with data being received by the 900 MHz transceiver. These issues may be occurring due to problems in the RF spectrum (e.g. low received signal power, multi-pathing, etc.). Being able to determine exactly what the 900 MHz transceiver is receiving in the RF spectrum may be beneficial to properly diagnose such a problem.

In order to "sniff" the 900 MHz RF spectrum of the transceiver, the Bluetooth transceiver is configured to access the received signals of the 900 MHz RF transceiver. The Bluetooth transceiver may access the received signals from the 900 MHz transceiver in a number of different ways.

In one example, as shown in FIG. 3B, the Bluetooth transceiver may be directly connected to the 900 MHz transceiver through a dedicated connection (e.g. trace to a diagnostic port on the 900 MHz transceiver). The diagnostic port directs a representation of the received signals of the 900 MHz transceiver, for example, in the form of a trace log, directly to the Bluetooth transceiver. Although not shown, the trace log may be parsed or compressed for streaming via the bandwidth available through the Bluetooth transceiver. This allows the Bluetooth transceiver to transmit representations of the signals received by the 900 MHz transceiver to the monitoring device where the trace logs or the like representing the actual RF spectrum detected by the 900 MHz transceiver itself are analyzed.

In another example, as shown in FIG. 3A, the Bluetooth transceiver may be indirectly connected to the 900 MHz transceiver through MCU 330. In this example, a dedicated connection (e.g. trace to a diagnostic port on the 900 MHz transceiver) may be connected to MCU 330 which then directs the representations of the received signals of the 900 MHz transceiver to the Bluetooth transceiver for transmission to the monitoring device.

In yet another example, as shown in FIG. 3C, the Bluetooth transceiver may be directly connected to the 900 MHz transceiver within the SOC architecture itself (e.g. a diagnostic port is not needed). Again, this allows the representations of the received signals of the 900 MHz transceiver to be directly input to the Bluetooth transceiver for transmission to the monitoring device.

In either example described above, trace logs or other representations of the received signals of the 900 MHz transceiver are directed to the Bluetooth transceiver, where they are then transmitted to the monitoring device. It is noted that the 900 MHz transceiver may have various operation sections. These may include an RF section, an intermediate frequency (IF) section and a demodulator. The signals being "sniffed" from the 900 MHz transceiver may be the RF signals received or the IF signals. In general, the representations of received signals are output to the Bluetooth transceiver prior to the demodulation stage in the 900 MHz transceiver.

Once received, the technician can then view and analyze the "sniffed" signals in an attempt to diagnose the problem at the 900 MHz transceiver. For example, the technician may utilize the monitoring device to perform computations on the data about the sniffed signals and/or view the power spectrum of the received signals to identify issues (e.g. low received signal power, frequency drift, multi-pathing, etc.). This analysis may reveal a problem with a transmitting device (e.g. the device transmitting the RF signals to the Luminaire may have a faulty transmitter), a problem with the 900 MHz transceiver of the Luminaire itself (e.g. oscillator drift, etc.), or a problem with the environment (e.g. interference signals, multi-pathing, etc.). Once the problem is identified, the technician may then take steps to rectify the situation (e.g. replace faulty devices, move devices to different locations, etc.).

Although the diagnostic commands monitor activity in the luminaire and/or lighting control device, these commands may also set parameters. For example, the monitoring device may transmit a command to the luminaire with instructions to not only monitor data, but to also change operational parameters (e.g. transmission power, etc.). These commands may be useful to test certain operational parameters, and/or to optimize parameters after the diagnostic information is analyzed by the technician to achieve better performance.

It should be noted that in addition to authentication of users, there may also be user authorization levels. For example, end consumers may have relatively low authorization level which may limit the commands available to them (e.g. retrieve firmware version number, etc.). Technicians, on the other hand, may have an intermediate authorization level which may make more commands available to them (e.g. view CPU activity, set transmission power, etc.). In addition, product engineers may have a high authorization level which may make all commands available to them (see list above). Such a hierarchy may be beneficial to protect the luminaires and lighting control devices from both malicious and careless/uniformed activity with respect to monitoring diagnostics and changing operational parameters.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A system for lighting control comprising:
a monitor device; and
a plurality of lighting system components each configured as a luminaire or as a lighting control device for controlling a luminaire,
the monitor device, including:
a wireless radio communication interface system configured for wireless communication over a diagnostic band;
a processor;
a memory accessible to the processor; and
programming in the memory which configures the processor to transmit a diagnostic command including a request for diagnostic data to at least one of the plurality of lighting system components, and
the plurality of lighting system components, each including:
a wireless radio communication interface system configured for wireless communication over the diagnostic band and a separate wireless lighting control network communication band;
a processor;
a memory accessible to the processor; and
programming in the memory which configures the processor to:
receive via the wireless radio communication interface over the diagnostic band, the diagnostic command transmitted from the monitor device; and
in response to receiving the diagnostic command, obtain the requested diagnostic data, and transmit via the wireless radio communication interface over the diagnostic band, the requested diagnostic data to the monitor device.

2. The system of claim 1,
wherein the monitor device is at least one of a mobile phone, a tablet computer, a laptop computer or an access point transceiver, and wherein the plurality of lighting system components includes at least one of a luminaire, a wall switch, a sensor, a power pack, and a plug load controller.

3. The system of claim 1, wherein the wireless radio communication interface of the monitor device and of the plurality of lighting system components includes a Bluetooth transceiver for communicating over the diagnostic band.

4. The system of claim 1, wherein the monitor device is located ON premises and communicates directly with the plurality of lighting system components, or wherein the monitor device is located OFF premises and communicates with the plurality of lighting system components via an ON premises access point.

5. The system of claim 1, wherein the wireless radio communication interface of the plurality of lighting system components each includes a first receiver and a second receiver connected to each other through an interface bus.

6. The system of claim 1, wherein the programming in the memory of the monitor device further configures the processor to:
output options to a display of the monitor device, the options including user selectable lighting system components and user selectable diagnostic commands; and
output the diagnostic data to the display of the monitor device or storing the diagnostic data in a file for later use.

7. The system of claim 1, wherein the programming in the memory of the monitor device further configures the processor to:
output login screen data to a display of the monitor device;
receive login information entered in the login screen; and
authorize the login information before allowing the monitor device to send the diagnostic command to the plurality of lighting system components.

8. A lighting control device comprising:
a wireless radio communication interface system configured for wireless communication over both a diagnostic band and a separate wireless lighting control network communication band;
at least one of:
  a) sensing circuitry to detect a state change of an occupancy, audio, or daylight sensor, or a switch to turn lighting on/off, dim up/down, or set scene; or
  b) a power switch to turn on/off power supplied to other devices;
a processor coupled to the at least one of the sensing circuitry or the power switch;
a memory accessible to the processor; and
programming in the memory which configures the processor to:
  receive via the wireless radio communication interface over the diagnostic band, a diagnostic command from a monitor device, the diagnostic command including a request for diagnostic data from the lighting control device; and
  in response to receiving the diagnostic command, obtain the requested diagnostic data, and transmit via the wireless radio communication interface over the diagnostic band, the requested diagnostic data to the monitor device.

9. The lighting control device of claim 8, wherein the lighting control device is at least one of a sensor, a wall switch, a plug load controller, a power pack for controlling one or more luminaires or devices powered through a plug load controller.

10. The lighting control device of claim 8, wherein the wireless radio communication interface includes a Bluetooth transceiver for communicating over the diagnostic band.

11. The lighting control device of claim 8, wherein the monitor device is located ON premises and communicates directly with the lighting control device, or wherein the monitor device is located OFF premises and communicates with the lighting control device via an ON premises access point.

12. The lighting control device of claim 8, wherein the wireless radio communication interface system includes a first receiver and a second receiver connected to each other through an interface bus.

13. The lighting control device of claim 8, wherein the programming in the memory further configures the processor to:
monitor at least one of the activity of the processor, or activity on the separate wireless lighting control network communication band in response to the diagnostic command; and
transmit via the wireless radio communication interface over the diagnostic band, the monitored activity as the requested diagnostic data to the monitor device.

14. The lighting control device of claim 8, wherein the programming in the memory further configures the processor to:
change a parameter on which the processor or the wireless radio communication interface uses to operate, in response to the diagnostic command including instructions to change the parameter.

15. A luminaire comprising:
a wireless radio communication interface system configured for wireless communication over both a diagnostic band and a separate wireless lighting control network communication band;
a processor;
a light source;
a memory accessible to the processor; and
programming in the memory which configures the processor to:
  receive via the wireless radio communication interface over the diagnostic band, a diagnostic command from a monitor device, the diagnostic command including a request for diagnostic data from the luminaire; and
  in response to receiving the diagnostic command, obtain the requested diagnostic data, and transmit via the wireless radio communication interface over the diagnostic band, the requested diagnostic data to the monitor device.

16. The luminaire of claim 15, wherein the wireless radio communication interface system includes a first receiver and a second receiver connected to each other through an interface bus.

17. The luminaire of claim 15, wherein the wireless radio communication interface includes a Bluetooth transceiver for communicating over the diagnostic band.

18. The luminaire of claim 15, wherein the monitor device is located ON premises and communicates directly with the luminaire, or wherein the monitor device is located OFF premises and communicates with the luminaire via an ON premises access point.

19. The luminaire of claim 15, wherein the programming in the memory further configures the processor to:
monitor at least one of the activity of the processor, or activity on the separate wireless lighting control network communication band in response to the diagnostic command; and
transmit via the wireless radio communication interface over the diagnostic band, the monitored activity as the requested diagnostic data to the monitor device.

20. The luminaire of claim 15, wherein the programming in the memory further configures the processor to:
change a parameter on which the processor or the wireless radio communication interface uses to operate, in response to the diagnostic command including instructions to change the parameter.

* * * * *